United States Patent
Dalmia et al.

(10) Patent No.: US 10,140,973 B1
(45) Date of Patent: Nov. 27, 2018

(54) TEXT-TO-SPEECH PROCESSING USING PREVIOUSLY SPEECH PROCESSED DATA

(71) Applicant: Amazon Technologies, Inc., Seattle, WA (US)

(72) Inventors: Manish Kumar Dalmia, Seattle, WA (US); Rafal Kuklinski, Gdynia (PL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/266,116

(22) Filed: Sep. 15, 2016

(51) Int. Cl.
| | |
|---|---|
| G10L 13/08 | (2013.01) |
| G10L 13/033 | (2013.01) |
| G10L 15/26 | (2006.01) |
| G10L 13/10 | (2013.01) |
| G10L 15/02 | (2006.01) |
| G10L 13/07 | (2013.01) |
| G06F 17/27 | (2006.01) |

(52) U.S. Cl.
CPC .......... *G10L 13/10* (2013.01); *G06F 17/2795* (2013.01); *G10L 13/07* (2013.01); *G10L 15/02* (2013.01); *G10L 15/26* (2013.01); *G10L 2015/022* (2013.01)

(58) Field of Classification Search
CPC ....... G10L 13/00; G10L 13/033; G10L 13/06; G10L 13/08; G10L 15/26; G06F 17/2795
USPC ...... 704/258, 260, 261, 266, 269; 379/88.16
See application file for complete search history.

(56) References Cited

U.S. PATENT DOCUMENTS

| | | | | |
|---|---|---|---|---|
| 5,913,193 A * | 6/1999 | Huang | ................... | G10L 13/07 704/256 |
| 6,035,273 A * | 3/2000 | Spies | ....................... | G10L 15/07 704/235 |
| 6,119,085 A * | 9/2000 | Lewis | .................... | G10L 13/04 704/255 |
| 6,173,250 B1 * | 1/2001 | Jong | ...................... | G06F 17/289 704/269 |
| 6,446,041 B1 * | 9/2002 | Reynar | .................. | G06F 3/167 704/235 |
| 6,823,309 B1 * | 11/2004 | Kato | ........................ | G10L 13/10 704/267 |
| 7,630,898 B1 * | 12/2009 | Davis | .................... | G10L 15/187 704/260 |
| 7,693,719 B2 * | 4/2010 | Chu | ....................... | G10L 13/033 704/258 |

(Continued)

Primary Examiner — Martin Lerner
(74) Attorney, Agent, or Firm — Pierce Atwood LLP

(57) ABSTRACT

Systems, methods, and devices for generating text-to-speech output using previously captured speech are described. Spoken audio is obtained and undergoes speech processing to create text. The resulting text is stored with the spoken audio, with both the text and the spoken audio being associated with the individual that spoke the audio. Various spoken audio and corresponding text are stored over time to create a library of speech units. When the individual sends a text message to a recipient, the text message is processed to determine portions of text, and the portions of text are compared to the library of text associated with the individual. When text in the library is identified, the system selects the spoken audio units associated with the identified stored text. The selected spoken audio units are then used to generate output audio data corresponding to the original text message, with the output audio data being sent to a device of the message recipient.

18 Claims, 21 Drawing Sheets

(56) References Cited

U.S. PATENT DOCUMENTS

| | | | | |
|---|---|---|---|---|
| 7,865,365 B2* | 1/2011 | Anglin | G10L 17/26 | 704/257 |
| 8,024,193 B2* | 9/2011 | Bellegarda | G10L 13/06 | 704/258 |
| 8,036,894 B2* | 10/2011 | Neeracher | G10L 13/08 | 704/258 |
| 8,423,366 B1* | 4/2013 | Foster | G10L 13/06 | 704/258 |
| 8,645,140 B2* | 2/2014 | Lobzakov | G10L 13/00 | 704/258 |
| 9,070,365 B2* | 6/2015 | Stephens, Jr. | G10L 13/10 | |
| 9,286,886 B2* | 3/2016 | Minnis | G10L 13/10 | |
| 9,633,649 B2* | 4/2017 | Bangalore | G10L 15/08 | |
| 9,786,267 B2* | 10/2017 | Mok | G11B 27/10 | |
| 2001/0053969 A1* | 12/2001 | Hogenhout | G06F 17/2765 | 715/267 |
| 2003/0028376 A1* | 2/2003 | Meron | G10L 13/06 | 704/258 |
| 2003/0135356 A1* | 7/2003 | Ying | G06F 17/271 | 704/1 |
| 2004/0073428 A1* | 4/2004 | Zlokarnik | G10L 13/033 | 704/260 |
| 2006/0287861 A1* | 12/2006 | Fischer | G10L 13/06 | 704/260 |
| 2008/0161948 A1* | 7/2008 | Bodin | G10L 15/26 | 704/235 |
| 2008/0288256 A1* | 11/2008 | Agapi | G10L 13/04 | 704/260 |
| 2009/0125309 A1* | 5/2009 | Tischer | G10L 13/033 | 704/260 |
| 2010/0100385 A1* | 4/2010 | Davis | G10L 13/00 | 704/260 |
| 2014/0019135 A1* | 1/2014 | Talwar | G10L 13/033 | 704/260 |
| 2014/0019138 A1* | 1/2014 | Stephens, Jr. | G10L 13/10 | 704/260 |
| 2014/0200894 A1* | 7/2014 | Osowski | G10L 13/08 | 704/260 |
| 2016/0104477 A1* | 4/2016 | Burkhardt | G10L 13/02 | 704/243 |
| 2016/0379638 A1* | 12/2016 | Basye | G10L 13/02 | 704/235 |

* cited by examiner

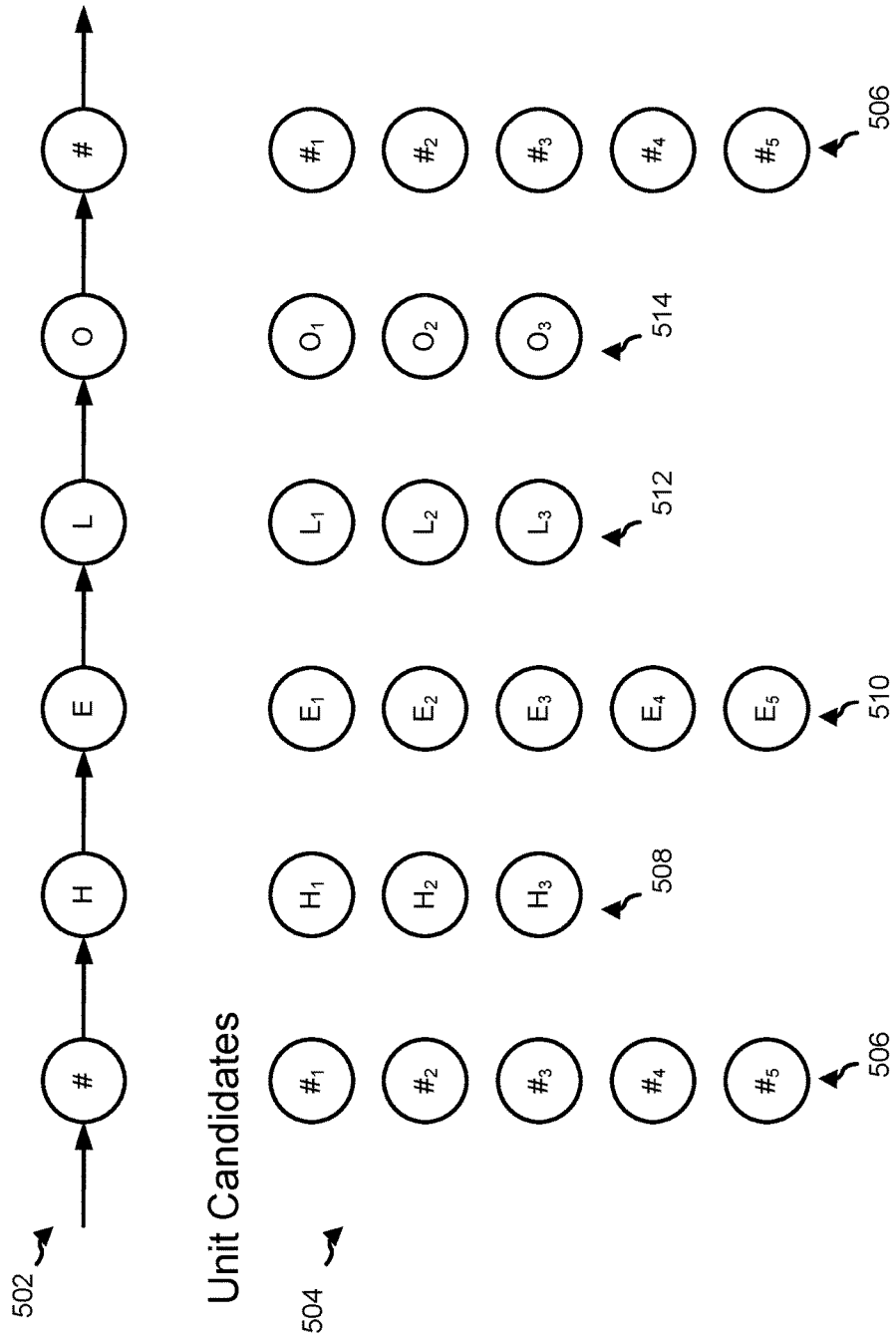

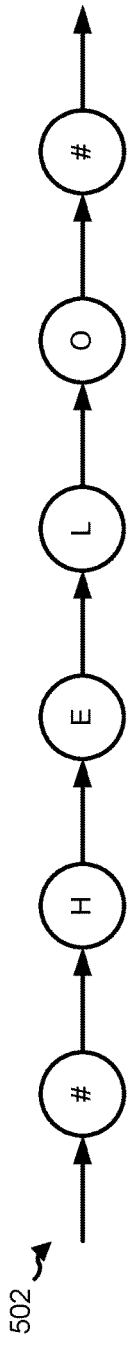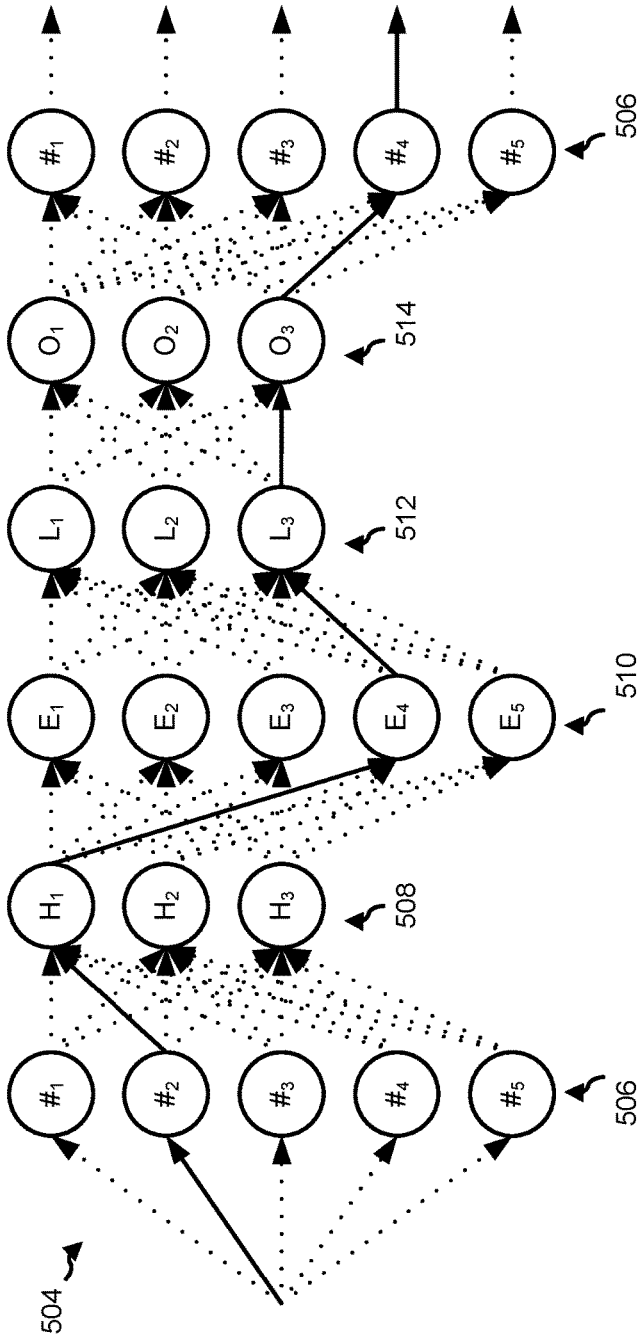
FIG. 5B

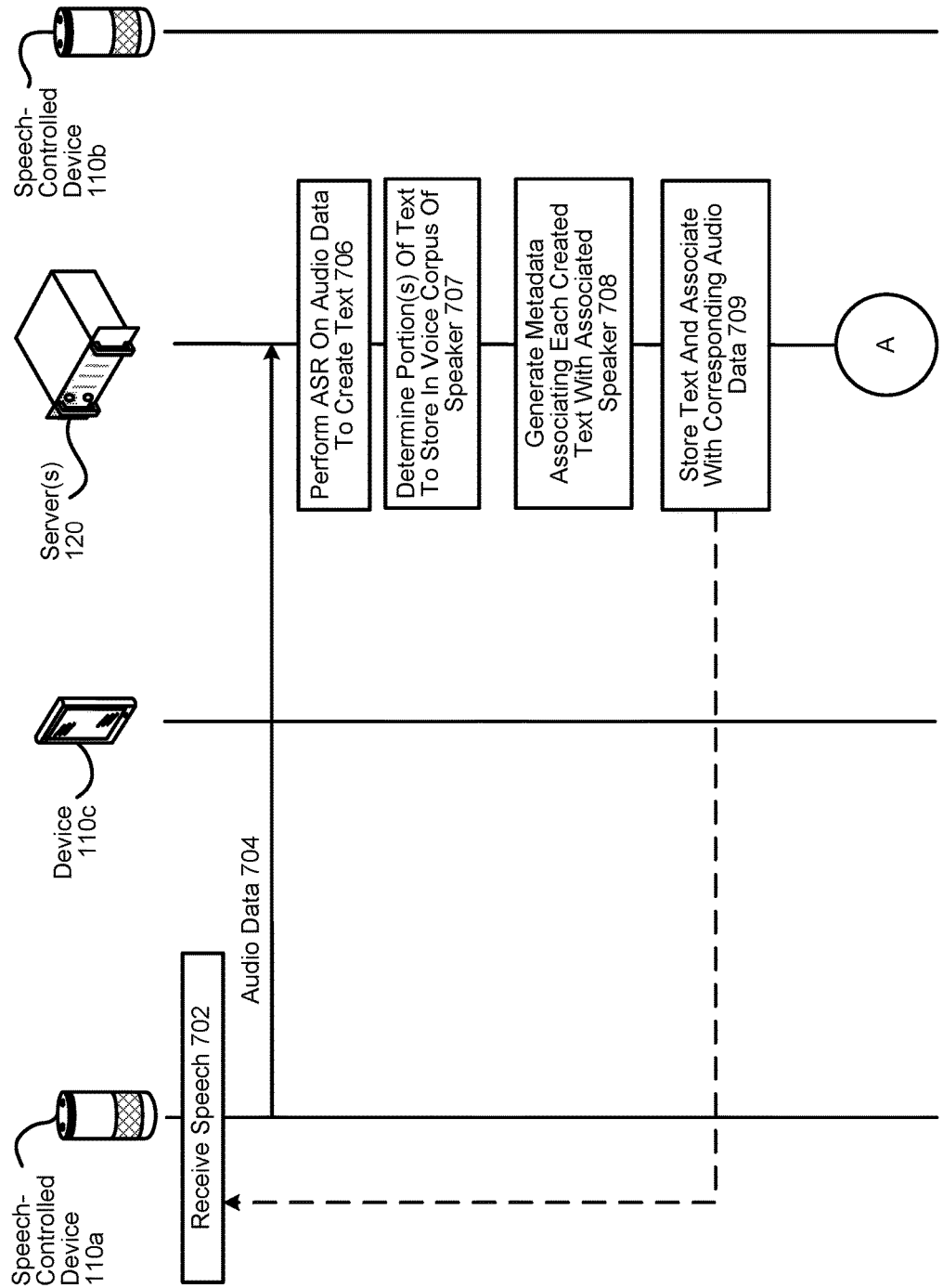

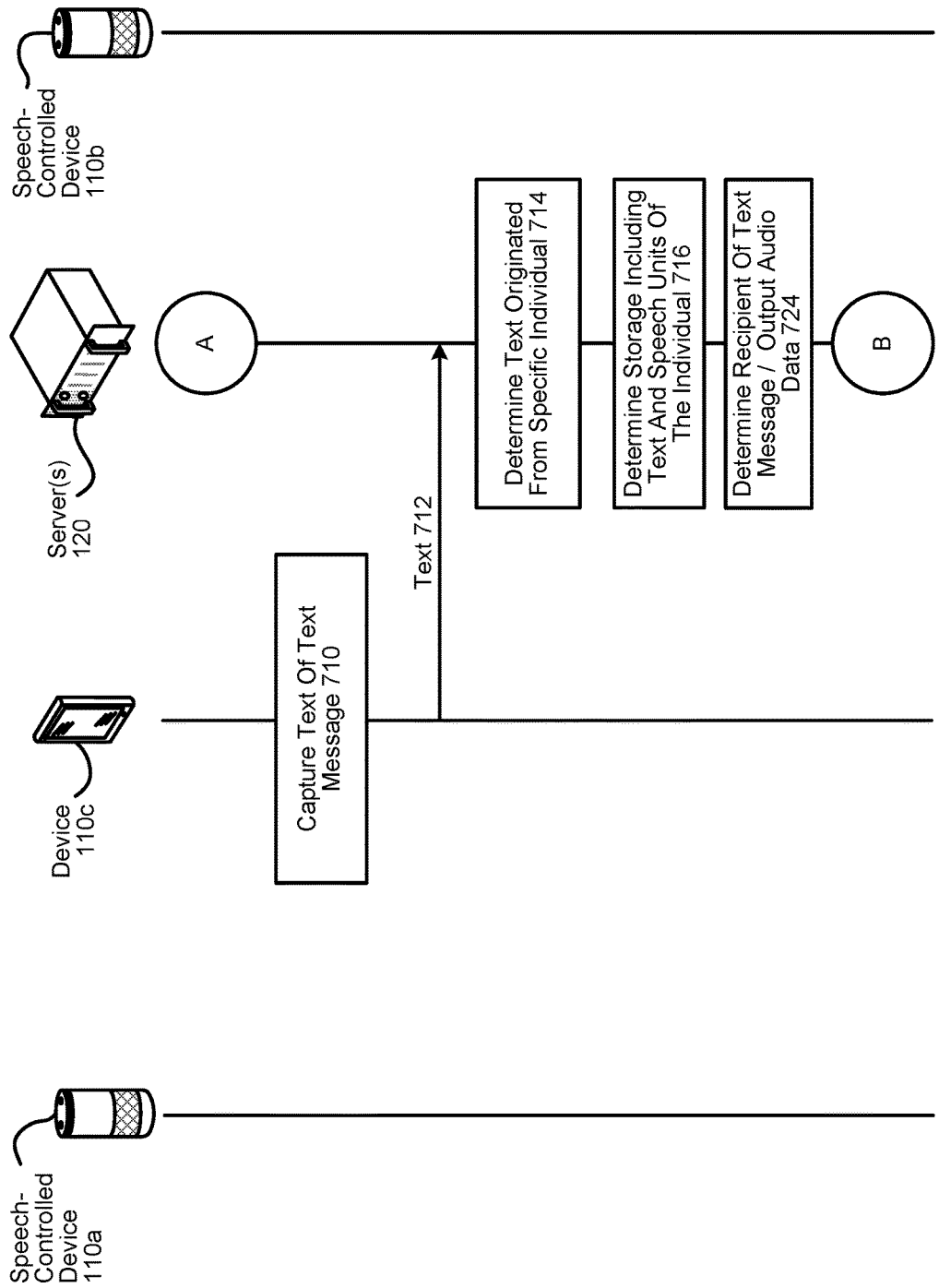

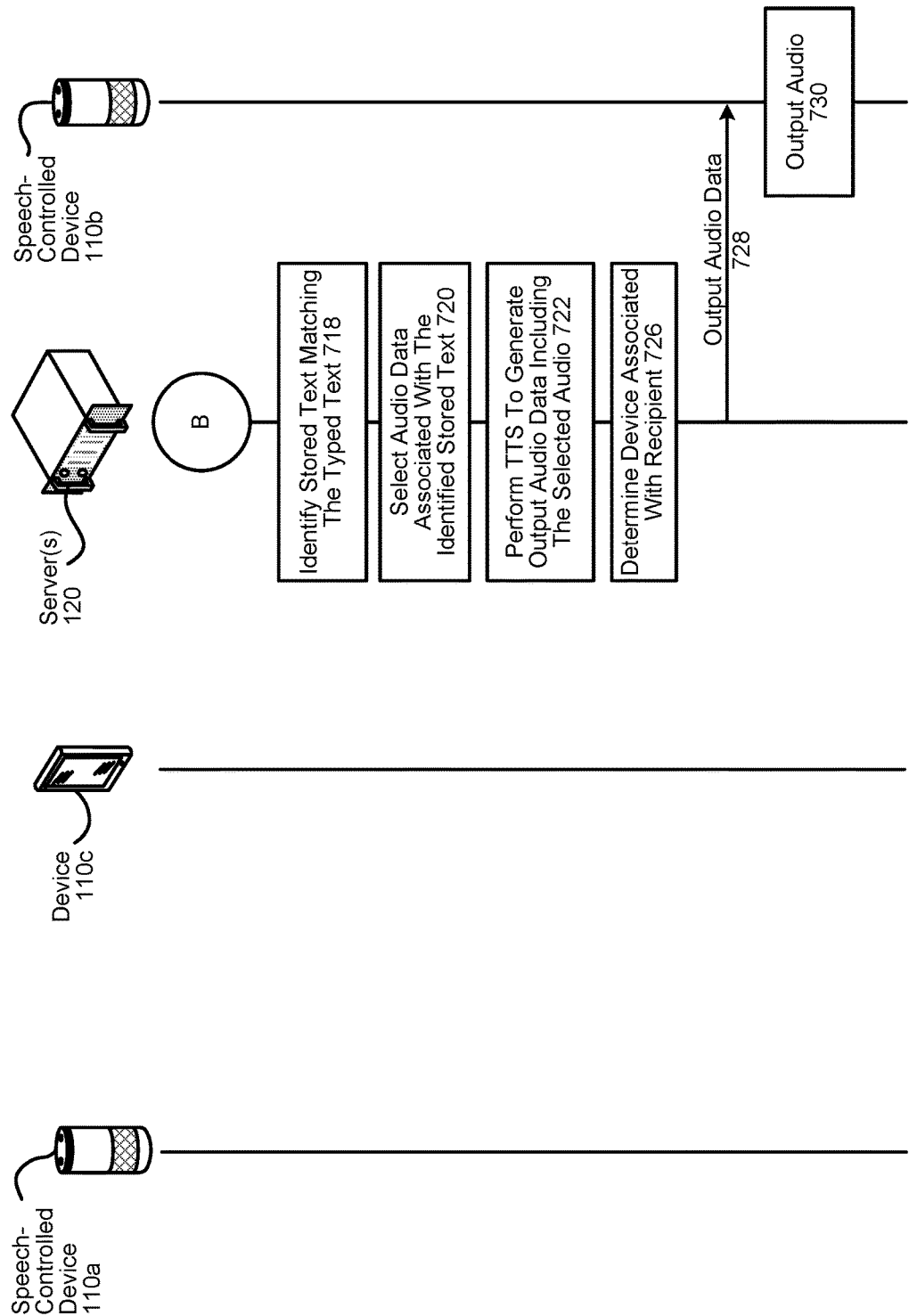

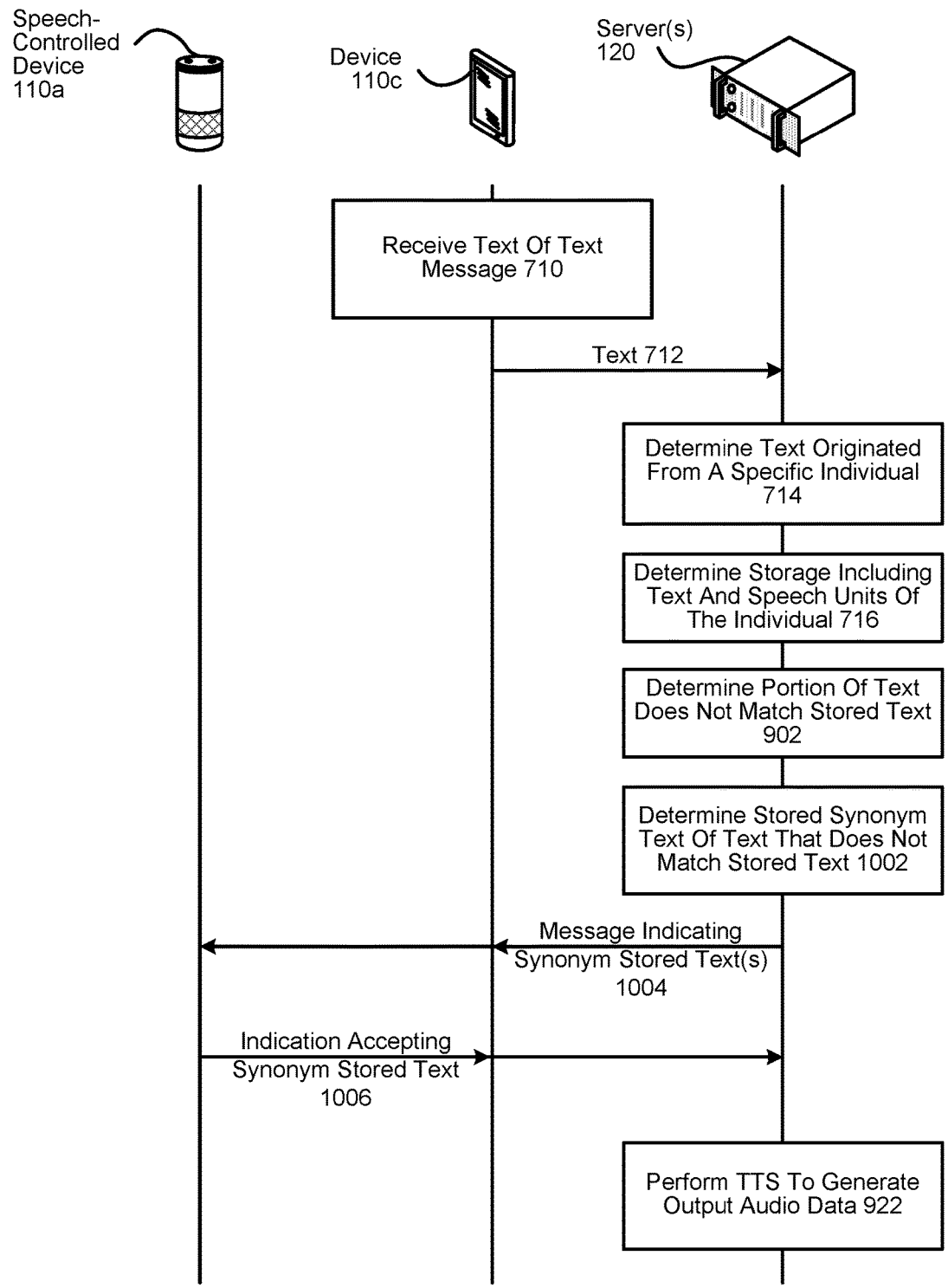

TEXT-TO-SPEECH PROCESSING USING PREVIOUSLY SPEECH PROCESSED DATA

BACKGROUND

Speech recognition systems have progressed to the point where humans can interact with computing devices by talking. Such systems employ techniques to identify the words spoken by a human user based on the various qualities of a received audio input. Speech recognition combined with natural language understanding processing techniques enable speech-based user control of a computing device to perform tasks. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 5A and 5B illustrate speech synthesis using unit selection according to one aspect of the present disclosure.

FIGS. 7A through 7C are a signal flow diagram illustrating the generation of text-to-speech output using previously captured speech according to embodiments of the present disclosure.

FIG. 10 is a signal flow diagram illustrating the offering and selection of alternative text for a text message according to embodiments of the present disclosure.

DETAILED DESCRIPTION

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

The present disclosure provides systems, methods, and devices for generating text-to-speech output in a user's voice using previously captured speech from the user. Spoken audio is obtained and undergoes speech processing (e.g., ASR and/or NLU) to create text. The resulting text is stored with the spoken audio, with both the text and the spoken audio being associated with the individual that spoke the audio. Various spoken audio and corresponding text are stored over time to create a library of speech units associated with the speaker. The speech units may be units of various sizes, as explained below.

The stored user's speech may be used to compile TTS output in a number of ways. In one example, the individual may desire to send a text message to a recipient. The text message may be compared to the library of text associated with the individual's previous speech. When text in the library corresponds to portions of the text message, the system selects the spoken audio units associated with the identified text in the library and then generates output audio data in the individual's voice. Thus, the system may use the individual's previous speech to create a synthesized spoken message corresponding to the original text message. The synthesized spoken message may then be sent to the intended recipient.

Figure 1:
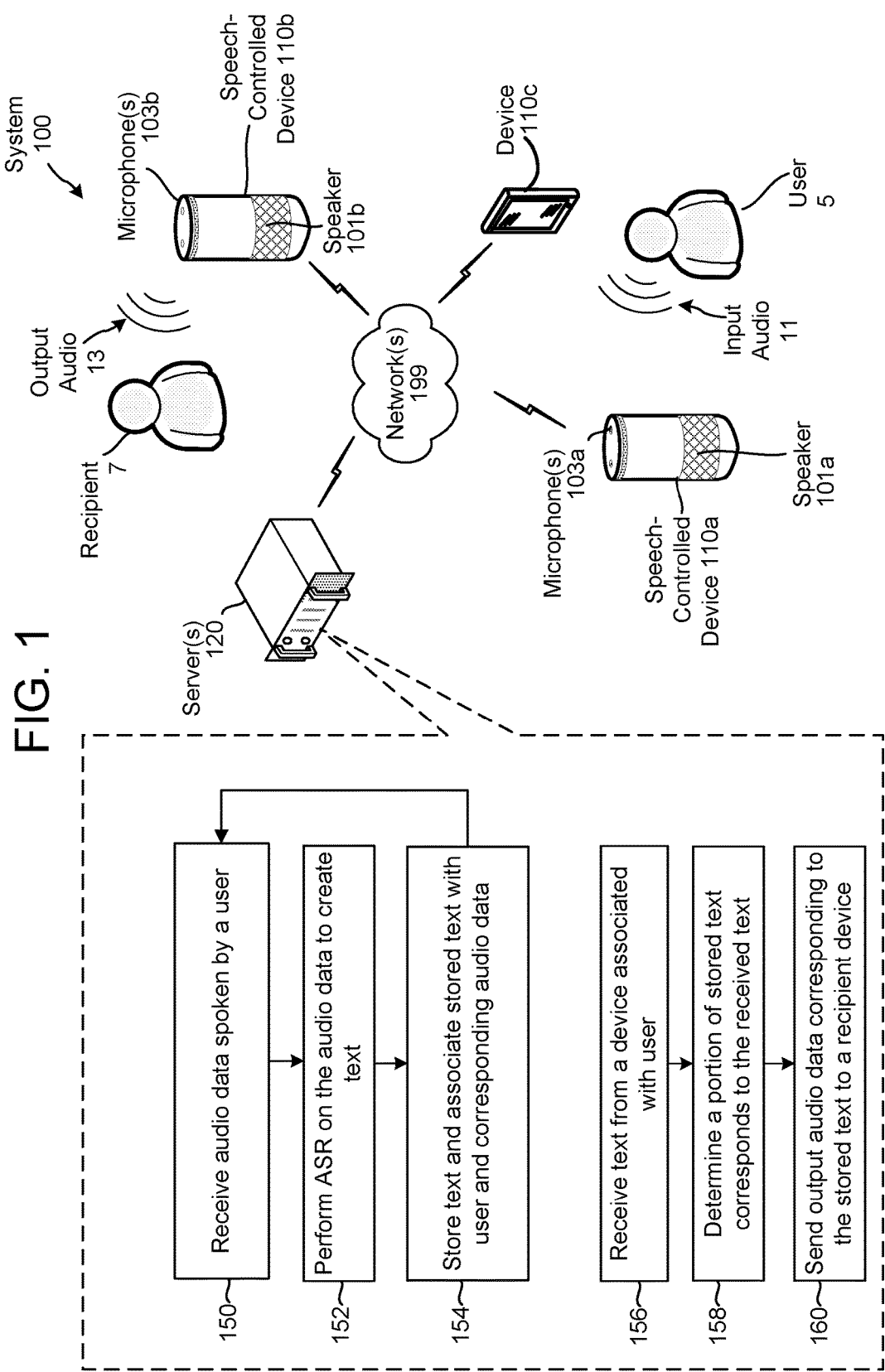
FIG. 1 illustrates a system for generating text-to-speech output using previously captured speech according to embodiments of the present disclosure.

FIG. 1 shows a system 100 configured to generate text-to-speech output using previously captured speech. Although FIG. 1, and other figures/discussion, illustrate the operation of the system 100 in a particular order, the steps described may be performed in a different order (as well as certain steps removed or added) without departing from the intent of the disclosure. As shown in FIG. 1, the system 100 may include one or more devices 110 local to a user 5 and recipient 7, as well as one or more networks 199 and one or more servers 120 connected to device(s) 110 across network (s) 199. The server(s) 120 (which may be one or more different physical devices) may be capable of performing traditional speech processing (such as ASR, NLU, query parsing, etc.) as described herein. A single server 120 may be capable of performing all speech processing or multiple servers 120 may combine to perform the speech processing. Further, the server(s) 120 may be configured to execute certain commands, such as answering queries spoken by the user 5 and/or recipient 7. In addition, certain speech detection or command execution functions may be performed by the device 110.

As shown in FIG. 1, the system 100 may be configured to generate text-to-speech output using previously captured speech. As shown, a speech controlled device 110a equipped with one or more microphones 103a is connected over a network 199 to one or more servers 120. The device 110a is configured to detect input audio 11 corresponding to a spoken utterance from a user 5. Detection of the input audio 11 may occur using the microphones 103a of the device 110a or a microphone array (not illustrated) separated from but associated with the device 110a. During a first period, the device 110a may then send audio data 111 corresponding to the audio 11 to the server 120 for further processing. The server may receive (150) the audio data and may perform (152) ASR on the audio data to create text. If the input audio 11 is captured by a microphone array that is connected to the device 110a, the microphone array may send audio data corresponding to the input audio 11 to the device 110a, which sends the audio data to the server 120. Alternatively, if the input audio 11 is captured by a microphone array that is connected to a companion application of a mobile computing device 110c, such as a smart phone, tablet, etc., the microphone array sends audio data corresponding to the input audio 11 to the companion application, which forwards the audio data to the device 110a and/or server 120. The server 120 stores (154) the text and associates the text with the user 5 and corresponding audio data. The server 120 may store the text as the text is created. By doing so, the server 120 creates a library of speech units, and corresponding text, spoken by and associated with the user 5. The audio data processed during steps 150-154 may correspond to various separate utterances spoken by the user 5 (such as different commands to the system 100 captured over a period of time) and/or may correspond to speech spoken during a training period where the system prompts the user for speech so the system may learn the user's voice.

At some point later, e.g., during a runtime period after the training, the user 5 may desire to send a text message to the recipient 7. The text message may be typed on a keyboard of a device 110c operating a companion application associated with the device 110a and/or server 120. The server 120 may receive (156) text, corresponding to the text message, from the companion application of the device 110c directly, or indirectly via the device 110a depending upon implementation. Knowing that the text was sent by the user 5, the server 120 accesses the library of previously spoken speech units associated with the user 5 and determines (158) stored text corresponding to the text of the text message. Such determination (and such speech units) may be on a phoneme level, diphone level, a word level, a sequence of words level, etc. Once stored text corresponding to the text of the text message is determined, the server 120 uses audio data associated with the determined text to generate output audio data. The server 120 may perform one or more smoothing operations on the output audio data to ensure the individualized portions of audio data that make up the output audio data sound as if the user 5 said the output audio data at one time. The server 120 then sends (160) the output audio data to a device 110b of the recipient 7, which outputs audio 13 to the recipient 7.

Similarly, the system 100 may be configured to generate multimedia responses. A spoken utterance of an individual may be captured by a microphone of a speech-controlled device 110. Simultaneously, video of the speaking individual may be captured by a camera (not illustrated) of the speech-controlled device 110, or by a camera separate from but associated with the speech-controlled device. The speech-controlled device 110 may send audio and video data to the server 120, which stores the audio and video data. The server 120 may also associate the stored audio data with the stored video data, as well as store text corresponding to the stored audio data. The stored data may be phoneme specific, diphone specific, word specific, etc. (e.g., if the stored text is specific to a diphone, stored audio data and video data associated with the text should also be specific to the same diphone). The system 100 may store such audio and video data as described for a multitude of spoken utterances in order to create a vast corpus of speech units and associated video for the individual.

At some point later, the server 120 may receive (156) text, corresponding to the text message. Knowing that the text was sent by the user 5, the server 120 accesses the library of previously spoken speech units associated with corresponding video data and determines (158) stored text corresponding to the text of the text message. Such determination (and such speech units) may be on a phoneme level, diphone level, a word level, a sequence of words level, etc. Once stored text corresponding to the text of the text message is determined, the server 120 uses audio and video data associated with the determined text to generate output multimedia data. The server 120 may perform one or more smoothing operations on the output multimedia data to ensure the individualized portions of audio and video data that make up the output multimedia data sound and look as if the user 5 recorded the output multimedia data at one time. The server 120 then sends the output multimedia data to a device 110b of the recipient 7, which outputs audio and video to the recipient 7.

Figure 2:
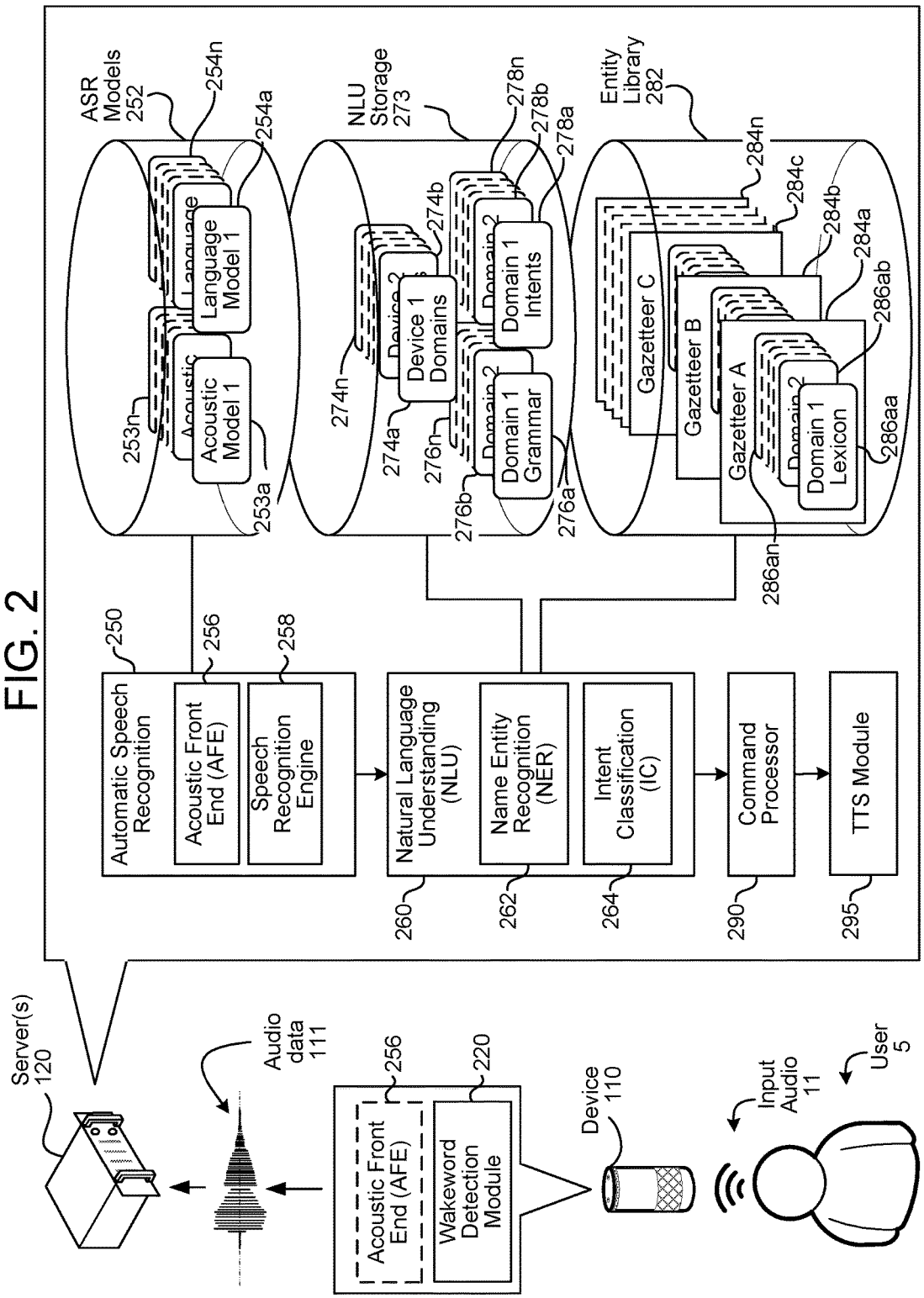
FIG. 2 is a conceptual diagram of how a spoken utterance may be processed according to embodiments of the present disclosure.

Further details of generating text-to-speech output using previously captured speech are explained below, following a discussion of the overall speech processing system of FIG. 2. The system 100 of FIG. 1 may operate using various speech processing components as described in FIG. 2. FIG. 2 is a conceptual diagram of how a spoken utterance is processed. The various components illustrated may be located on a same or different physical devices. Communication between various components illustrated in FIG. 2 may occur directly or across a network 199. An audio capture component, such as a microphone 103 of device 110, captures audio 11 corresponding to a spoken utterance. The device sends audio data 111 corresponding to the utterance, to an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

An ASR process 250 converts the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model knowledge base (ASR Models Storage 252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR process 250 may include an acoustic front end (AFE) 256 and a speech recognition engine 258. The acoustic front end (AFE) 256 transforms the audio data from the microphone into data for processing by the speech recognition engine 258. The speech recognition engine 258 compares the speech recognition data with acoustic models 253, language models 254, and other data models and information for recognizing the speech conveyed in the audio data. The AFE 256 may reduce noise in the audio data and divide the digitized audio data into frames representing time intervals for which the AFE 256 determines a number of values, called features, representing the qualities of the audio data, along with a set of those values, called a feature vector or audio feature vector, representing the features/qualities of the audio data within the frame. Many different features may be determined, as known in the art, and each feature represents some quality of the audio that may be useful for ASR processing. A number of approaches may be used by the AFE 256 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage 252. Alternatively, post front-end processed data (such as feature vectors) may be received by the device executing ASR processing from another source besides the internal AFE 256. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server 120, for natural language understanding (NLU) processing, such as conversion of the text into commands for execution, either by the device 110, by the server 120, or by another device (such as a server running a search engine, etc.)

The device performing NLU processing 260 (e.g., server 120) may include various components, including potentially dedicated processor(s), memory, storage, etc. A device configured for NLU processing 260 may include a named entity recognition (NER) module 252, intent classification (IC) module 264, NLU storage 273 and a knowledge base (not shown). The knowledge base is a database or other information storage that may include information about entities that may be used in resolving user queries. The NLU process may also utilize gazetteer information (284a-284n) stored in entity library storage 282. The knowledge base and/or gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process 260 takes textual input (such as processed from ASR 250 based on the utterance 11) and attempts to make a semantic interpretation of the text. That is, the NLU process 260 determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

As will be discussed further below, the NLU process 260 may be configured to parse and tag to annotate text as part of NLU processing. For example, for the text "call mom,"

"call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU storage 273 includes a database of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query may be processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains being ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 262 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrases relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 262 may search the database of generic words associated with the domain (in the NLU's storage 273). For instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER module 262 may also use contextual operational rules to fill slots. For example, if a user had previously requested to pause a particular song and thereafter requested that the voice-controlled device "please un-pause my music," the NER module 262 may apply an inference-based rule to fill a slot associated with the name of the song that the user currently wishes to play—namely the song that was playing at the time the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of the system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search query (for example, requesting the return of search results), the destination command processor 290 may include a search engine processor, such as one located on a search server, configured to execute a search command and determine search results, which may include output text to be processed by a TTS engine and output from a device as synthesized speech. If the NLU output includes a command to send a message, the command processor 290 may be a messaging processor configured to send text messages, or configured to work with a TTS module 295 to create audio data corresponding to synthesized speech including the message content.

Figure 3:
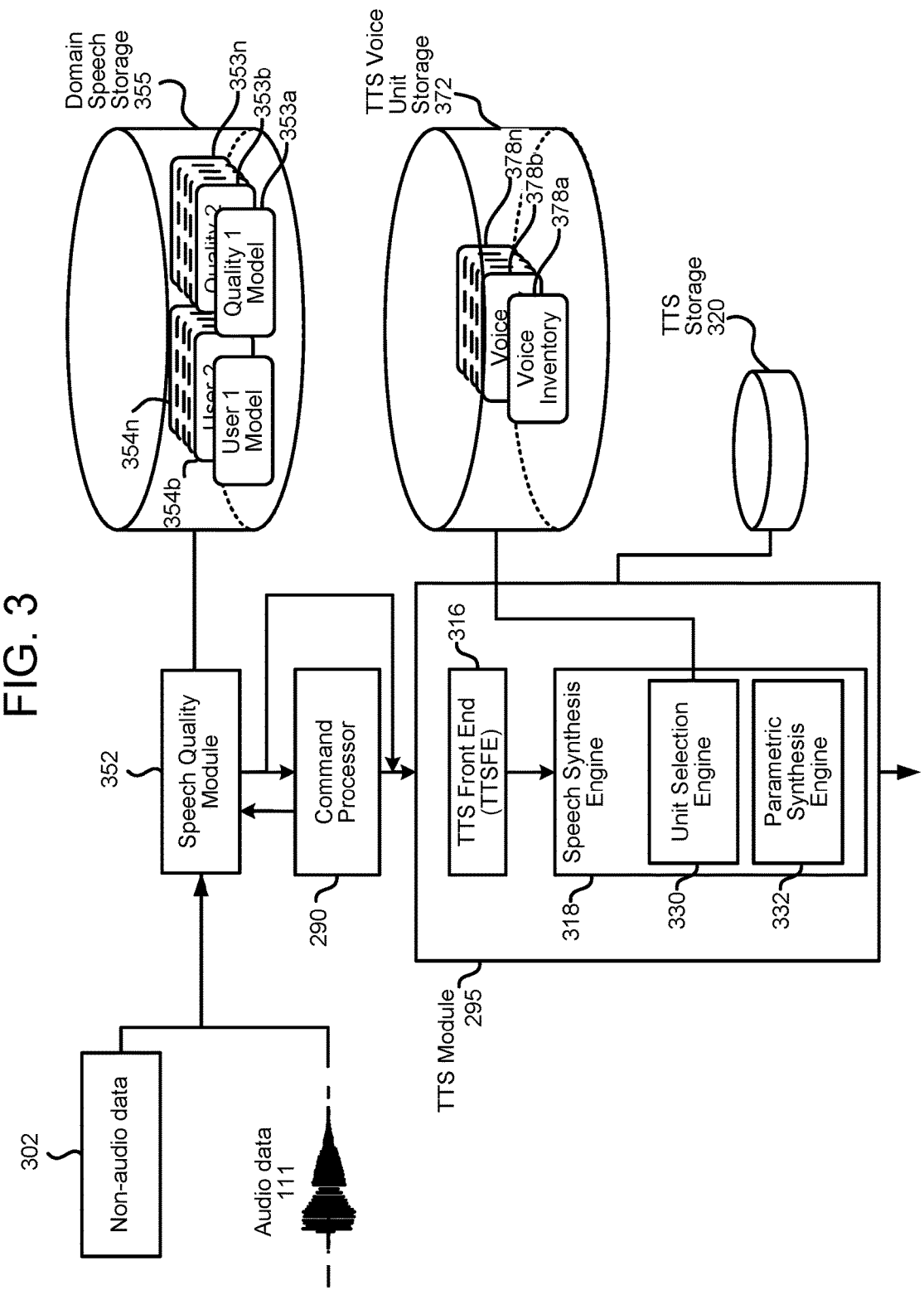
FIG. 3 is a conceptual diagram of how speech quality may be determined and used for generating text-to-speech output according to embodiments of the present disclosure.

Components that may be used to perform TTS processing are shown in FIG. 3. As shown in FIG. 3, the system may employ a speech quality module 352 to analyze incoming audio data 111 (and potentially non-audio data 302) to determine a quality/qualities of incoming speech. The system may also employ customized models 354 that are customized for particular users for purposes of categorizing the user's speech. Each user may have multiple such models. The user models 354 may be used by the speech quality module 352 to analyze a user's speech or to select a speech quality in a manner more customized for a specific user for ultimate TTS purposes. For example, the system may track a user's utterances to determine how they normally speak, or how they speak under certain conditions, and use that information to train user-specific models 354. Thus the system may determine the speech quality using some representation of a reference of how a user speaks. The user models 354 may incorporate both audio data 111 and non-audio data 302, which may incorporate not only how a user speaks, but how a user speaks under particular circumstances (i.e., with many individuals present, at different locations, under different lighting conditions, etc.) The user models 354 may also take into account eventual commands and/or speech output by the system so that the system may determine how user commands are processed under certain conditions. Each user model 354 may be associated with a user ID, which may be linked to a user profile (604, discussed below) containing various other information about a particular user. Such profile information may also be used to train the user model 354.

The speech quality module 352 may be used each time a user speaks an utterance. That is, the speech quality module 352 may provide speech quality information for each spoken utterance as it is captured by the system. This enables the system to build a TTS voice corpus including speech quality information for the user as speech is captured. In addition, the speech quality module 352 may capture prosodic qualities of spoken utterances. Moreover, the speech quality module 352 may perform sentiment analysis on incoming spoken utterances to assign a sentiment to each utterance. The sentiment assigned to an utterance represents an emotion of the speaker of the utterance. Example sentiments include happy, sad, mad, perplexed, etc.

The speech quality module 352 may use the models 353, 354 to process audio data 111 and/or non-audio data 302 to determine one or more speech qualities to associate with an input spoken utterance, such as a training utterance. Certain words may be emphasized by a user based on non-audio data. For example, a user may emphasize different words based on the time of day. In another example, words may be emphasized based on what application is operating on the device. In a further example, words may be emphasized based on the device being operated by the user (e.g., a tablet, a speech-controlled device, etc.). The speech quality module 352 may then create an indicator for the determined speech quality/ies. The indicator may then be sent to a downstream command processor 290 so that a command/query may be processed using the indicator and based on the speech quality/ies. The command processor 290 receives the indicator, as well as text and possible other semantic notation related to the utterance, as discussed above in reference to FIG. 2. The command processor 290 may be a component capable of acting on the utterance. Examples of such components include a query processor/search engine, music player, video player, calendaring application, email/messaging application, user interaction controller, personal assistant program, etc. As can be appreciated, many types of command processors 290 are envisioned.

The command processor 290 and/or a TTS module 295 may be configured to select text corresponding to previously spoken audio based on speech quality. For example, if text of a text message matches multiple portions of stored, previously spoken text, the command processor 290 and/or TTS module 295 may select one of the multiple stored portions based on a speech quality associated with the stored text. That is, the system (e.g., the command processor 290 and/or TTS module 295) may process the message text to determine a speech quality, and thereby select a stored text having the same or similar speech quality.

The TTS module/processor 295 may include a TTS front end (TTSFE) 316, a speech synthesis engine 318, and TTS storage 320. The TTSFE 316 transforms input text data (for example from command processor 290) into a symbolic linguistic representation for processing by the speech synthesis engine 318. The TTSFE 316 may also process tags or other data input to the TTS module 295 that indicate how specific words should be pronounced. The speech synthesis engine 318 compares the annotated phonetic units models and information stored in the TTS storage 320 for converting the input text into speech. The TTSFE 316 and speech synthesis engine 318 may include their own controller(s)/processor(s) and memory or they may use the controller/processor and memory of the server 120, device 110, or other device, for example. Similarly, the instructions for operating the TTSFE 316 and speech synthesis engine 318 may be located within the TTS module 295, within the memory and/or storage of the server 120, device 110, or within an external device.

Text input into a TTS module 295 may be sent to the TTSFE 316 for processing. The front-end may include modules for performing text normalization, linguistic analysis, and linguistic prosody generation. During text normalization, the TTSFE processes the text input and generates standard text, converting such things as numbers, abbreviations (such as Apt., St., etc.), symbols ($, %, etc.) into the equivalent of written out words.

During linguistic analysis the TTSFE 316 analyzes the language in the normalized text to generate a sequence of phonetic units corresponding to the input text. This process may be referred to as grapheme to phoneme conversion. Phonetic units include symbolic representations of sound units to be eventually combined and output by the system as speech. Various sound units may be used for dividing text for purposes of speech synthesis. A TTS module 295 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage 320. The linguistic analysis performed by the TTSFE 316 may also identify different grammatical components such as prefixes, suffixes, phrases, punctuation, syntactic boundaries, or the like. Such grammatical components may be used by the TTS module 295 to craft a natural sounding audio waveform output. The language dictionary may also include letter-to-sound rules and other tools that may be used to pronounce previously unidentified words or letter combinations that may be encountered by the TTS module 295. Generally, the more information included in the language dictionary, the higher quality the speech output.

Based on the linguistic analysis the TTSFE 316 may then perform linguistic prosody generation where the phonetic units are annotated with desired prosodic characteristics, also called acoustic features, which indicate how the desired phonetic units are to be pronounced in the eventual output speech. During this stage the TTSFE 316 may consider and incorporate any prosodic annotations that accompanied the text input to the TTS module 295. Such acoustic features may include pitch, energy, duration, and the like. Application of acoustic features may be based on prosodic models available to the TTS module 295. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTSFE 316, referred to as a symbolic linguistic representation, may include a sequence of phonetic units annotated with prosodic characteristics. This symbolic linguistic representation may be sent to a speech synthesis engine 318, also known as a synthesizer, for conversion into an audio waveform of speech for output to an audio output device and eventually to a user. The speech synthesis engine 318 may be configured to convert the input text into high-quality natural-sounding speech in an efficient manner. Such high-quality speech may be configured to sound as much like a human speaker as possible, or may be configured to be understandable to a listener without attempts to mimic a precise human voice.

A speech synthesis engine 318 may perform speech synthesis using one or more different methods. In one method of synthesis called unit selection, described further below, a unit selection engine 330 matches the symbolic linguistic representation created by the TTSFE 316 against a database of recorded speech, such as a database of a voice corpus. The unit selection engine 330 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, a unit selection engine 330 may match units to the input text to create a natural sounding waveform. The unit database may include multiple examples of phonetic units to provide the system with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis called parametric synthesis parameters such as frequency, volume, noise, are varied by a parametric synthesis engine 332, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. A TTS module 295 may include an acoustic model, or other models, which may convert a symbolic linguistic representation into a synthetic acoustic waveform of the text input based on audio signal manipulation. The acoustic model includes rules which may be used by the parametric synthesis engine 332 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTSFE 316.

The parametric synthesis engine 332 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 318, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise) based vocoders, CELP (code-excited linear prediction) vocoders, GlottHMM vocoders, HSM (harmonic/stochastic model) vocoders, or others.

Figure 4:
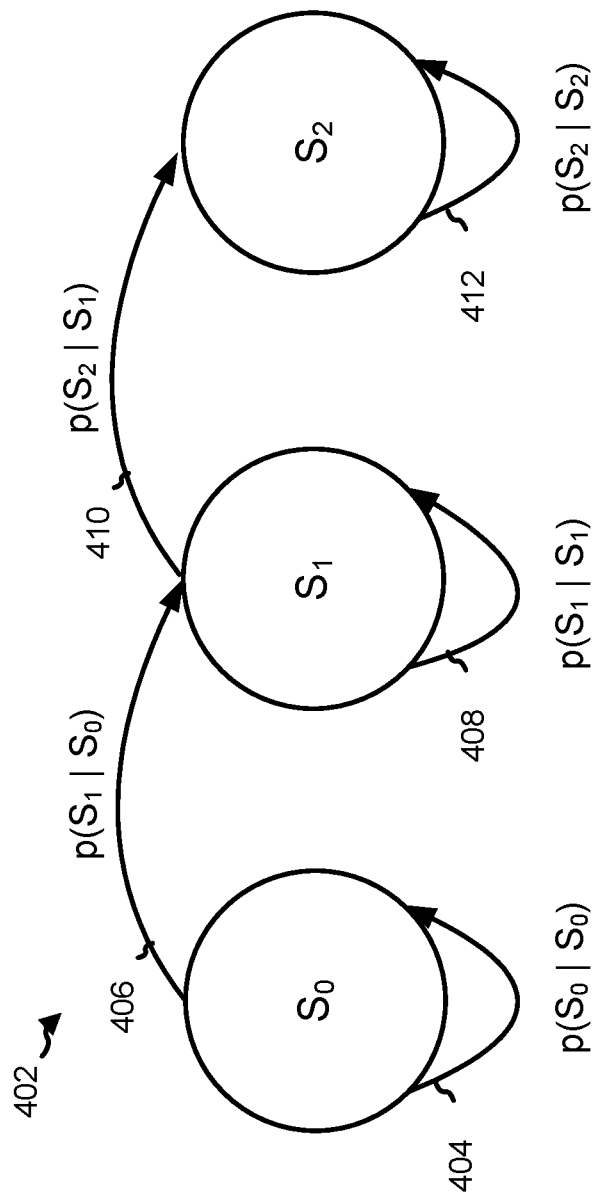
FIG. 4 illustrates speech synthesis using a Hidden Markov Model to perform text-to-speech (TTS) processing according to one aspect of the present disclosure.

An example of HMM processing for speech synthesis is shown in FIG. 4. A sample input phonetic unit, for example, phoneme /E/, may be processed by a parametric synthesis engine 332. The parametric synthesis engine 332 may initially assign a probability that the proper audio output associated with that phoneme is represented by state $S_0$ in the Hidden Markov Model illustrated in FIG. 4. After further processing, the speech synthesis engine 318 determines whether the state should either remain the same, or change to a new state. For example, whether the state should remain the same 404 may depend on the corresponding transition probability (written as $P(S_0|S_0)$, meaning the probability of going from state $S_0$ to $S_0$) and how well the subsequent frame matches states $S_0$ and $S_1$. If state $S_1$ is the most probable (e.g., using the transition probability $P(S_1|S_0)$ 406), the calculations move to state $S_1$ and continue from there. For subsequent phonetic units, the speech synthesis engine 318 similarly determines whether the state should remain at $S_1$, using the transition probability represented by $P(S_1|S_1)$ 408, or move to the next state, using the transition probability $P(S_2|S_1)$ 410. As the processing continues, the parametric synthesis engine 332 continues calculating such probabilities including the probability 412 of remaining in state $S_2$ or the probability of moving from a state of illustrated phoneme /E/ to a state of another phoneme. After processing the phonetic units and acoustic features for state $S_2$, the speech recognition may move to the next phonetic unit in the input text.

The probabilities and states may be calculated using a number of techniques. For example, probabilities for each state may be calculated using a Gaussian model, Gaussian mixture model, or other technique based on the feature vectors and the contents of the TTS storage 320. Techniques such as maximum likelihood estimation (MLE) may be used to estimate the probability of particular states.

In addition to calculating potential states for one audio waveform as a potential match to a phonetic unit, the parametric synthesis engine 332 may also calculate potential states for other potential audio outputs (such as various ways of pronouncing phoneme /E/) as potential acoustic matches for the phonetic unit. In this manner multiple states and state transition probabilities may be calculated.

The probable states and probable state transitions calculated by the parametric synthesis engine 332 may lead to a number of potential audio output sequences. Based on the acoustic model and other potential models, the potential audio output sequences may be scored according to a confidence level of the parametric synthesis engine 332. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text.

Unit selection speech synthesis may be performed as follows. Unit selection includes a two-step process. First a unit selection engine 330 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the features of a desired speech output (e.g., pitch, prosody, etc.). A join cost represents how well a speech unit matches a consecutive speech unit for purposes of concatenating the speech units together in the eventual synthesized speech. The overall cost function is a combination of target cost, join cost, and other costs that may be determined by the unit selection engine 330. As part of unit selection, the unit selection engine 330 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS storage 320 or in another storage component. For example, different unit selection databases may be stored in TTS voice unit storage 372. Each speech unit database includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 318 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output. An example of how unit selection is performed is illustrated in FIGS. 5A and 5B.

For example, as shown in FIG. 5A, a target sequence of phonetic units 502 to synthesize the word "hello" is determined by a TTS device. As illustrated, the phonetic units 502 are individual phonemes, though other units, such as diphones, etc. may be used. A number of candidate units 504 may be stored in the voice corpus. Although phonemes are illustrated in FIG. 5A, other phonetic units, such as diphones, may be selected and used for unit selection speech synthesis. For each phonetic unit there are a number of potential candidate units (represented by columns 506, 508, 510, 512 and 514) available. Each candidate unit represents a particular recording of the phonetic unit with a particular associated set of acoustic and linguistic features. The TTS system then creates a graph of potential sequences of candidate units to synthesize the available speech. The size of this graph may be variable based on certain device settings. An example of this graph is shown in FIG. 5B. A number of potential paths through the graph are illustrated by the different dotted lines connecting the candidate units. A Viterbi algorithm may be used to determine potential paths through the graph. Each path may be given a score incorporating both how well the candidate units match the target units (with a high score representing a low target cost of the candidate units) and how well the candidate units concatenate together in an eventual synthesized sequence (with a high score representing a low join cost of those respective candidate units). The TTS system may select the sequence that has the lowest overall cost (represented by a combination of target costs and join costs) or may choose a sequence based on customized functions for target cost, join cost or other factors. The candidate units along the selected path through the graph may then be combined together to form an output audio waveform representing the speech of the input text. For example, in FIG. 5B the selected path is represented by the solid line. Thus units #$_2$, H$_1$, E$_4$, L$_3$, O$_3$, and #$_4$ may be selected, and their respective audio concatenated, to synthesize audio for the word "hello."

Audio waveforms including the speech output from the TTS module 295 may be sent to an audio output component, such as a speaker for playback to a user or may be sent for transmission to another device, such as another server 120, for further processing or output to a user. Audio waveforms including the speech may be sent in a number of different formats such as a series of feature vectors, uncompressed audio data, or compressed audio data. For example, audio speech output may be encoded and/or compressed by an encoder/decoder (not shown) prior to transmission. The encoder/decoder may be customized for encoding and decoding speech data, such as digitized audio data, feature vectors, etc. The encoder/decoder may also encode non-TTS data of the system, for example using a general encoding scheme such as .zip, etc.

A TTS module 295 may be configured to perform TTS processing in multiple languages. For each language, the TTS module 295 may include specially configured data, instructions and/or components to synthesize speech in the desired language(s). To improve performance, the TTS module 295 may revise/update the contents of the TTS storage 320 based on feedback of the results of TTS processing, thus enabling the TTS module 295 to improve speech recognition.

Other information may also be stored in the TTS storage 320 for use in speech recognition. The contents of the TTS storage 320 may be prepared for general TTS use or may be customized to include sounds and words that are likely to be used in a particular application. As noted above, the TTS storage 320 may be customized for an individual user based on his/her individualized desired speech output. In particular, the speech unit stored in a unit database may be taken from input audio data of the user speaking.

For example, to create the customized speech output of the system, the system may be configured with multiple voice inventories 378a-378n, where each unit database is configured with a different "voice" to match desired speech qualities. Such voice inventories may also be linked to user accounts 604, discussed below. One voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual and recorded by the system. The TTS training utterances used to train a TTS voice corpus may be different from the training utterances used to train an ASR system or the models used by the speech quality detector. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 378 may then be used during runtime to perform unit selection to synthesize speech having a speech quality corresponding to the input speech quality. Alternatively (or in addition), the system may capture various command utterances spoken by a user for the system, may analyze them using a speech quality module 352, and may build a voice corpus from many user utterances over time.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile and used for speech synthesis when the specific speech quality is desired. Customized voices may be created based on multiple desired speech qualities combined (for both unit selection or parametric synthesis). For example, one voice may be "shouted" while another voice may be "shouted and emphasized." Many such combinations are possible.

As an alternative to customized voice corpuses or customized parametric "voices," one or more filters may be used to alter traditional TTS output to match the desired one or more speech qualities. For example, a TTS module 295 may synthesize speech as normal, but the system (either as part of the TTS module 295 or otherwise) may apply a filter to make the synthesized speech sound take on the desired speech quality. In this manner a traditional TTS output may be altered to take on the desired speech quality.

During runtime a TTS module 295 may receive text for speech synthesis along with an indicator for a desired speech quality of the output speech, for example, an indicator created by speech quality module 352. The TTS module 295 may then select a voice matching the speech quality, either for unit selection or parametric synthesis, and synthesize speech using the received text and speech quality indicator.

Figure 6:
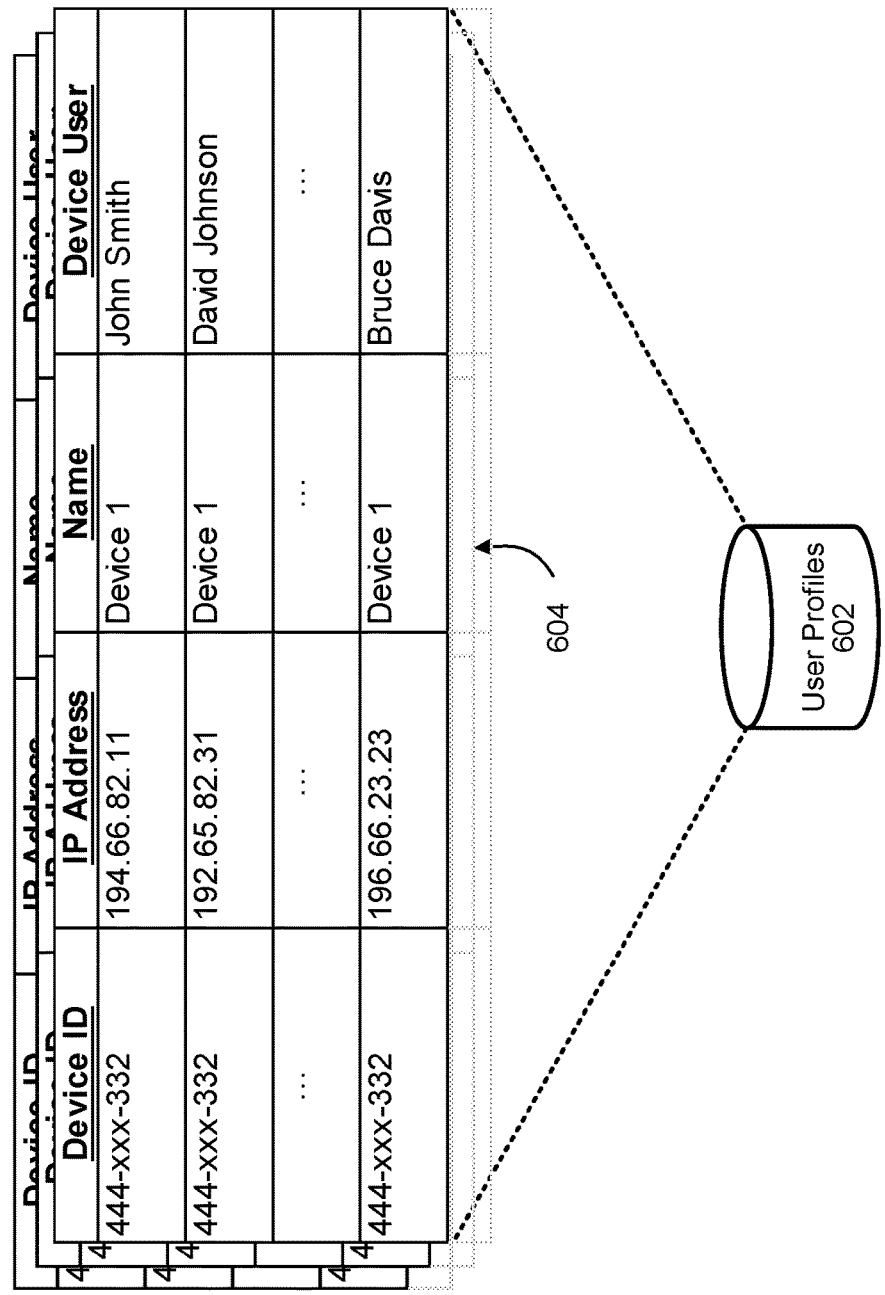
FIG. 6 illustrates data stored and associated with user profiles according to embodiments of the present disclosure.

FIG. 6 illustrates a user profile storage 602 that includes data regarding user accounts 604 as described herein. The user profile storage 602 may be located proximate to the server 120, or may otherwise be in communication with various components, for example over the network 199. The user profile storage 602 may include a variety of information related to individual users, accounts, etc. that interact with the system 100. For example, each user account may include text and associated audio data corresponding to audio previously spoken by the respective user. For further example, as shown in FIG. 6, a user account 604 may include the names of individuals (e.g., recipients) as well as information regarding the recipients' devices. The TTS module/component described herein may access the user accounts 604 to determine stored text (and associated audio data) corresponding to text of a text message. In an example, the user profile storage 602 is a cloud-based storage. Such data may include device identifier (ID) and internet protocol (IP) address information for different devices as well as names by which the devices may be referred to by a user. Further qualifiers describing the devices may also be listed along with a description of the type of object of the device. In certain instances, a device may have multiple users. When this occurs, the system may be configured to associate stored information with a speaker ID, thereby keeping data of multiple users of a single device separate. For example, when speech is captured by a speech-controlled device (or other device), text corresponding to the speech may be stored and associated with a user ID and user profile of the speaker. This enables the system to locate previous speech of a particular user for purposes of generating output audio data when a given device has multiple users.

FIGS. 7A through 7C illustrate the generation of text-to-speech output in a user's voice using previously captured speech from the user. A speech-controlled device 110*a* receives (702) spoken audio from a user. The spoken audio may be received during, for example, a setup of the speech-controlled device 110*a*. Alternatively, the spoken audio may be received during use (i.e., runtime) of the speech-controlled device 110*a* as the user speaks different commands for execution by the system. As the speech is received, the speech-controlled device 110*a* converts the speech into audio data, and sends (704) the audio data to a server 120. The server 120 performs (706) ASR on received audio data to create text. The server 120 also determines (707) one or more portions of received audio data/generated text that should be stored in a voice corpus of the speaker. For example, the server 120 may compare the created text to previously stored text (or compare speech unit IDs of the incoming speech to speech unit IDs corresponding to stored speech units) corresponding to previously spoken utterances, and therefrom determine portions of the newly created text that do not correspond to previously stored text. For example, if certain diphones or speech units are sufficiently represented in a voice inventory 378, the system may not store further such diphones, whereas if the voice inventory 378 is missing certain example diphones, the server 120 may store audio for those diphones. This prevents duplication of text/audio data within the speaker's voice corpus. For example, if the received audio states "Hello John," and the server 120 determines "hello" is already stored but "John" is not, the server 120 may discard "hello" and only store text and audio data corresponding to "John," thereby further building the voice corpus of the speaker without creating duplication of records. The server 120 generates (708) metadata (e.g., a tag, speaker ID, etc.) associating the determined portion(s) of text with the speaker of the spoken utterance, and stores (709) the text. The server 120 associates the stored text with audio data from which the text was created. (If the audio data is associated with a command, the system may also perform NLU/command execution where appropriate.) In addition, the text and corresponding audio data may be associated with the speaker of the original audio, via the metadata (e.g., speaker ID) associated with the stored text and audio data. The metadata associates the stored text and audio data with a user profile of the speaker and/or the speech-controlled device 110*a* that captured the spoken utterance. It should be appreciated that steps 702 through 709 may be performed iteratively over time in order to build a robust voice corpus for users.

Each portion of speech received by the speech-controlled device 110*a* may correspond to a sequence of words, a single word, a diphone, etc. As such, it should be appreciated that the audio data sent to the server 120, as well as the stored text and audio data may correspond to sequences of words, single words, diphones, and/or the like. In addition, the server 120 may process received audio data into smaller pieces of audio data. For example, if the received audio data includes a sequence of words, the server 120 may process the received audio data into multiple pieces of audio data that each correspond to a single word, diphone, etc. Using the stored audio data and text, the system may create and populate a TTS voice corpus using audio data spoken in the user's voice. The voice corpus and audio/text data may be stored in TTS storage 320, TTS voice unit storage 372, user profile 604, or elsewhere.

Each portion of stored text and corresponding audio data may be tagged to indicate one or more prosodic characteristics of the audio data. For example, the system may use the speech quality module 352 to classify the audio data so the system knows a prosodic characteristic(s) of the stored audio data. The prosodic characteristic of audio data, and associated text, may be used to select text for TTS processing when multiple portions of stored text correspond to a portion of a text message.

Once the TTS system has sufficient data to enable synthesizing speech in a user's voice (i.e., has performed steps 702 through 709 enough times to create a substantial voice corpus of the speaker), the voice corpus may be used, for example, for messaging applications. A device 110*c* may capture (710) input content text of a text message, and optionally recipient text corresponding to an intended recipient of the text message. The device 110c may capture the text via a keyboard integrated into the device 110c, or a keyboard in communication with the device 110c via wireless communications, Bluetooth, etc. The device 110c, for example via a companion application, sends (712) the captured text (i.e., the content text and optionally the recipient text) to the server 120. Alternatively, the message/recipient text may be obtained after performing ASR on an incoming utterance commanding the system to send a message.

The server 120 may determine (714) the individual that typed the text message, and therefrom may determine (716) a storage including text and audio data of the individual. For example, determining the individual may include determining an ID (e.g., speaker ID as described above) unique to the individual, and determining a storage of the individual may include determining a user profile and corresponding voice corpus storage associated with the individual's unique ID. The individual's identity may be determined based on the device 110c (and optionally the companion application) from which the text message was received.

The server 120 also determines (724) an intended recipient of the text message. If the text received from the device 110c by the server 120 includes only content text, the server 120 may identify the recipient within the content text. For example, in such a situation, the content text may state "Ask John Smith when is our next meeting." In this example, the server 120 would use NLU processing to determine "ask" as a command to send a message, determine stored text corresponding to "when is our next meeting" to generate the output audio data, and determine "John Smith" as being the recipient. Alternatively, if the text received from the device 110c by the server 120 includes recipient text, the server 120 may identify the recipient form such text. For example, recipient text may be captured in a "To" line of a messaging application on the device 110c.

Individuals may speak to different recipients using different language/parametric characteristics (i.e., an acoustic model of an individual may change depending on who the individual is speaking with). For example, an individual may speak to its mom in a first voice, its spouse in a second voice, its child in a third voice, etc. Moreover, an individual may use different words when speaking to different individuals. It should thus be appreciated that the storage/voice corpus of the text message sender may be segmented based on recipient, thereby creating "recipient profiles" including text and associated audio data used when communicating with a respective individual. For example, when speech is received and stored by the server 120 to build the voice corpus of the speaker, as described herein above, the speech may be additionally tagged with metadata to indicate a recipient profile of the recipient of the speech when it is spoken and stored. Optionally, a given individual may have multiple voice corpus storages, with each being unique to a given recipient. This enables the server 120 to subsequently generate output audio data having speech characteristics similar or identical to those perceived by a given recipient in face-to-face conversations with the speaker.

Knowing the appropriate voice corpus storage (i.e., that of the text message sender) and the intended recipient, the server 120 identifies (718) stored text matching the content text of the text message. The content text of the text message may correspond to a single portion of stored text, or multiple portions of stored text. The server 120 then selects (720) audio data (corresponding to audio previously spoken to the recipient by the individual sending the text message) associated with the identified stored text. To select the audio data, the server 120 may identify data annotated to the previously spoken and stored audio. An illustrative annotation includes speech theme/sentiment. Using the selected audio data, the server 120 generates (722) output audio data. This generation may include TTS operations, such as those described above, where the output audio data is synthesized (at least in part) to sound like it is being spoken by the user. For example, sentiment annotation of the selected audio data may direct a TTS component that generates the output audio data to select speech units that match characteristics of the speech, thereby causing the output audio data to sound as if it were spoken by the user. If more than one portion of selected audio data is used to generate the output audio data, the server 120 may perform, or may cause to be performed, one or more smoothing operations on the output audio data. This ensures the output audio data sounds more like fluid human speech than individual speech units merely being concatenated together (resulting in inconsistent speech tones, etc.).

After determining the recipient, the server 120 determines (726) a device associated with the recipient. This may be done by locating the recipient's name and corresponding recipient device information within a contact list of a user profile associated with the individual sending the text message. The server 120 sends (728) the generated output audio data to the recipient's device (i.e., the speech-controlled device 110b), which outputs (730) audio to the recipient.

Figure 8A:
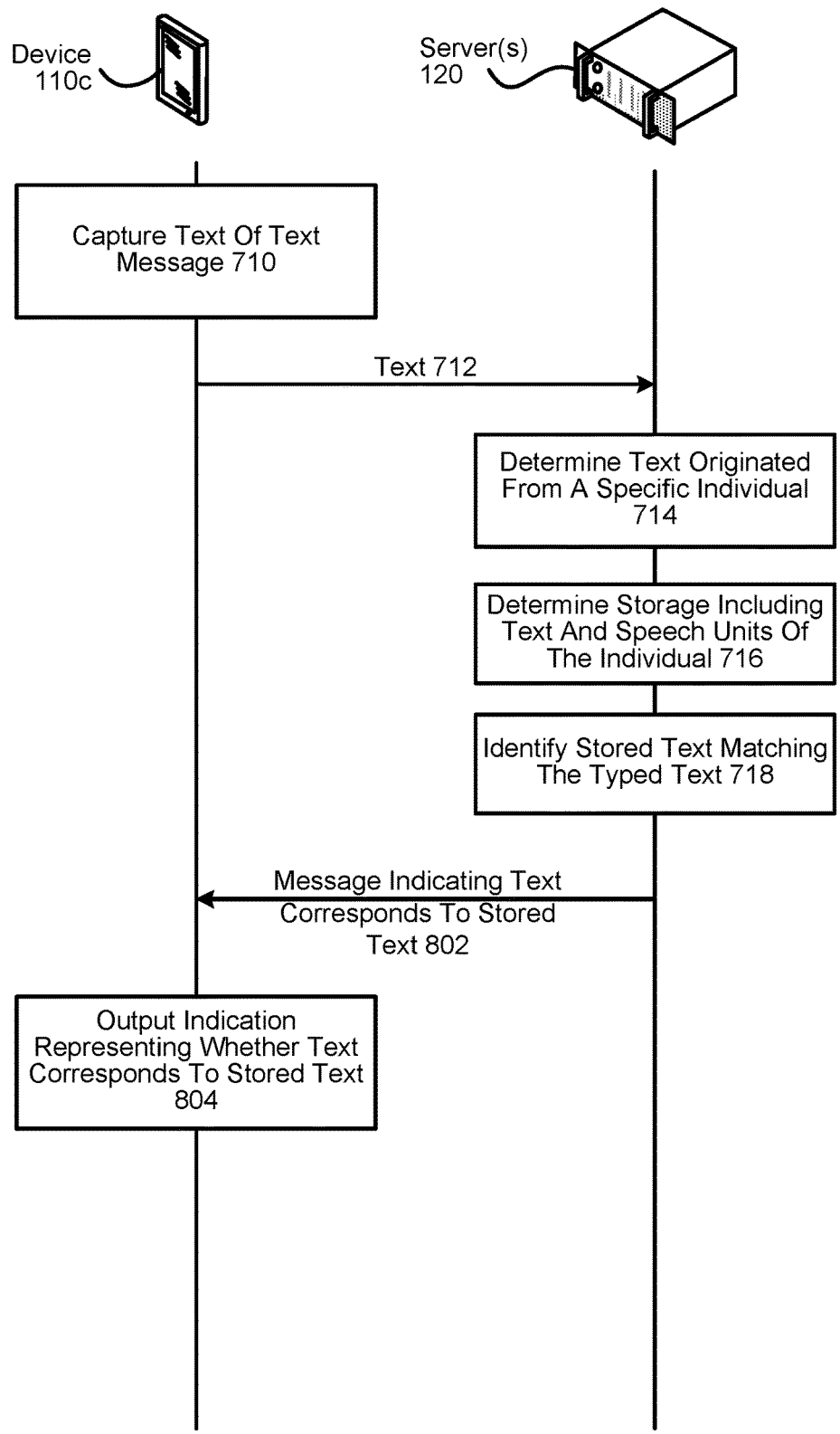
FIG. 8A is a signal flow diagram illustrating the output of an indication representing whether stored text corresponds to text of a text message according to embodiments of the present disclosure.
Figure 8B:
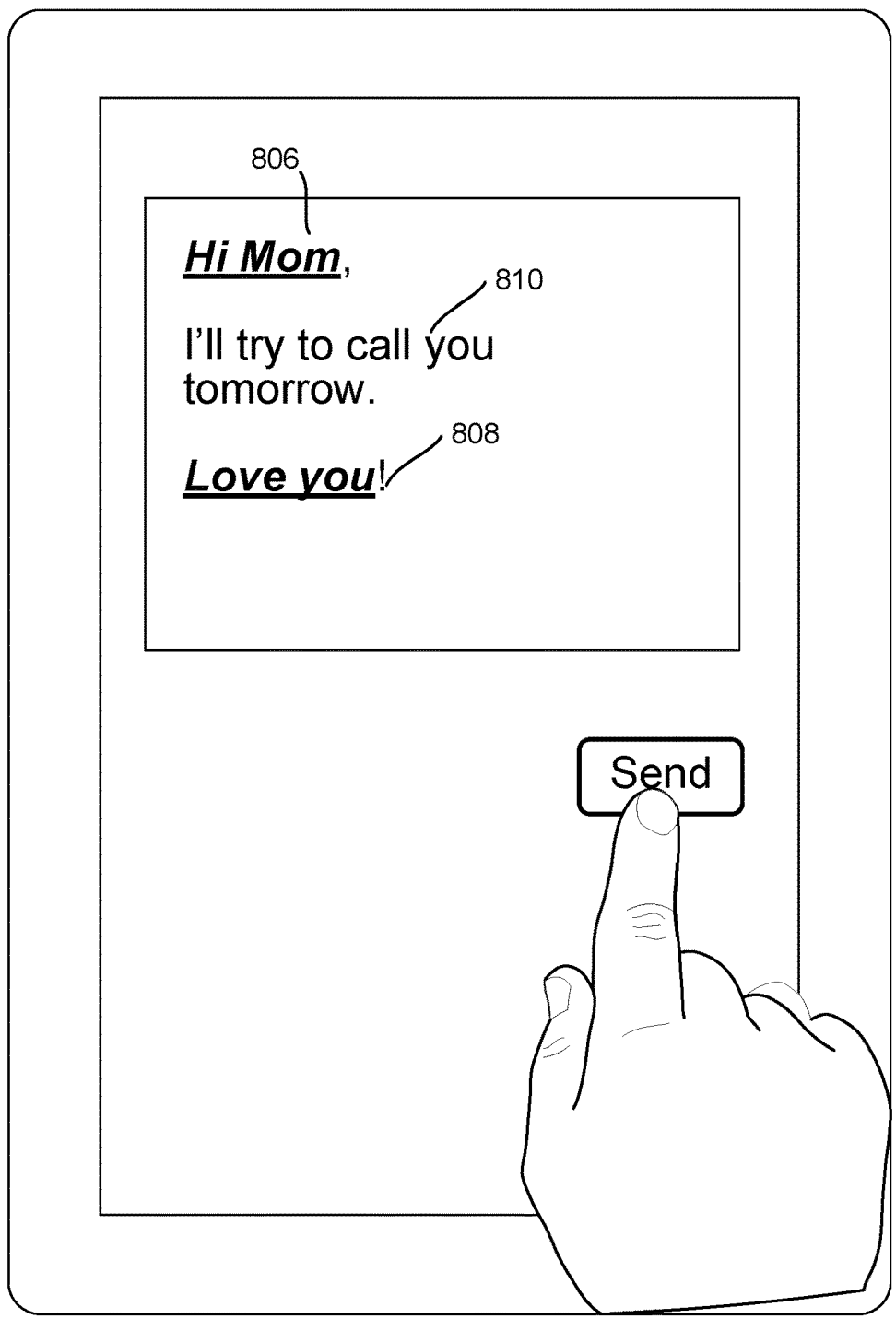
FIG. 8B illustrates a user device indicating that certain portions of a text message may correspond to stored text while other portions of a text message may not correspond to stored text.

As a user is typing a text message for use with the above system, it may be desirable to provide some feedback to the user to indicate whether the system has sufficient audio data to ultimately send a message in the user's voice. The system's ability to do so may be limited by the amount of stored audio, the corresponding text of the stored audio, or other factors. A process for outputting such an indication is shown in FIGS. 8A-8B. In particular, FIG. 8A illustrates the output of an indication representing whether stored text corresponds to text of a text message. A device 110c may capture (710) input content text of a text message, and optionally recipient text corresponding to an intended recipient of the text message. The device 110c may capture the text via a keyboard integrated into the device 110c, or a keyboard in communication with the device 110c via wireless communications, Bluetooth, etc. The device 110c, for example via a companion application, sends (712) the captured text (i.e., the content text and optionally the recipient text) to the server 120.

The server 120 may determine (714) the individual that typed the text message, and therefrom may determine (716) a storage including text and audio data of the individual. The individual's identity may be determined based on the device 110c (and optionally the companion application) from which the text message was received. Determination of the storage of the individual may be performed by identifying a user profile of the individual. Knowing the appropriate storage, the server 120 identifies (718) stored text matching the content text of the text message. The content text of the text message may correspond to a single portion of stored text, or multiple portions of stored text.

The server 120 then sends (802) a message to the device 110c (or another device of the individual represented in the individual's user profile) indicating whether and which text of the text message corresponds to stored text associated with audio data corresponding to previously spoken content of the individual. In turn, the device 110c (or other device of the individual) outputs (804) an indication representing the text of the text message that does and does not correspond to stored text associated with audio data corresponding to previously spoken content of the individual. In this manner the system can notify the user what portions of the text message the system may ultimately be able to output in the user's voice.

The output indication may be visual, audible, and/or tactile. Moreover, the output indication may be specific on a diphone, word, and/or sequence of word level. That is, the output indication may be specific according to the stored text. For example, if the text message states "Hi Mom, I'll try to call you tomorrow. Love you!", the entire text may be shown in a single color indicating all of the text of the message corresponds to stored text and thus will be able to be spoken in the user's voice. In a further example, if the text message states "Hi Mom, I'll try to call you tomorrow. Love you!", "Hi Mom," and "Love you!" may correspond to stored text, while "I'll try to call you tomorrow." (and individual portions thereof) may not correspond to stored text. In this example, if the output indication is visual, "Hi Mom," and "Love you!" may be displayed in a first color with or without effects (e.g., blinking, etc.), while "I'll try to call you tomorrow." may be displayed in a different shade of the first color or a second color with or without effects. Alternatively, both the text corresponding and not corresponding to stored text may be shown in the exact same color, with either the text corresponding to the stored text or the text not corresponding to stored text being displayed with an effect (e.g., blinking, etc.). If the output indication is audible, the output audio may be computer generated, or may be generated using previous speech of a user, for example giving the user an audio preview of what the ultimate message will sound like. If the output is tactile, the server 120 may send a message to the device 110c (or a device such as a smart watch that is associated with the individual's user profile), thus causing the device (or peripheral device) to vibrate.

As specifically illustrated in FIG. 8B, font manipulation may also be used to visually indicate to a user which portions of text correspond to stored text, and which portions do not. As illustrated, for example, the bolded and underlined portions of text 806 and 808 may indicate those portions of text correspond to stored text, while regular typeface 810 may be used to indicate text that does not correspond to stored text. Other font manipulations than those described may be used. If the output indication is audible, the output audio may be computer generated, or may be generated using previous speech of a user. If the output is tactile, the device 110c (or a device such as a smart watch that is associated with the individual's user profile) may be caused to vibrate (i.e., output a haptic indication).

Figure 9A:
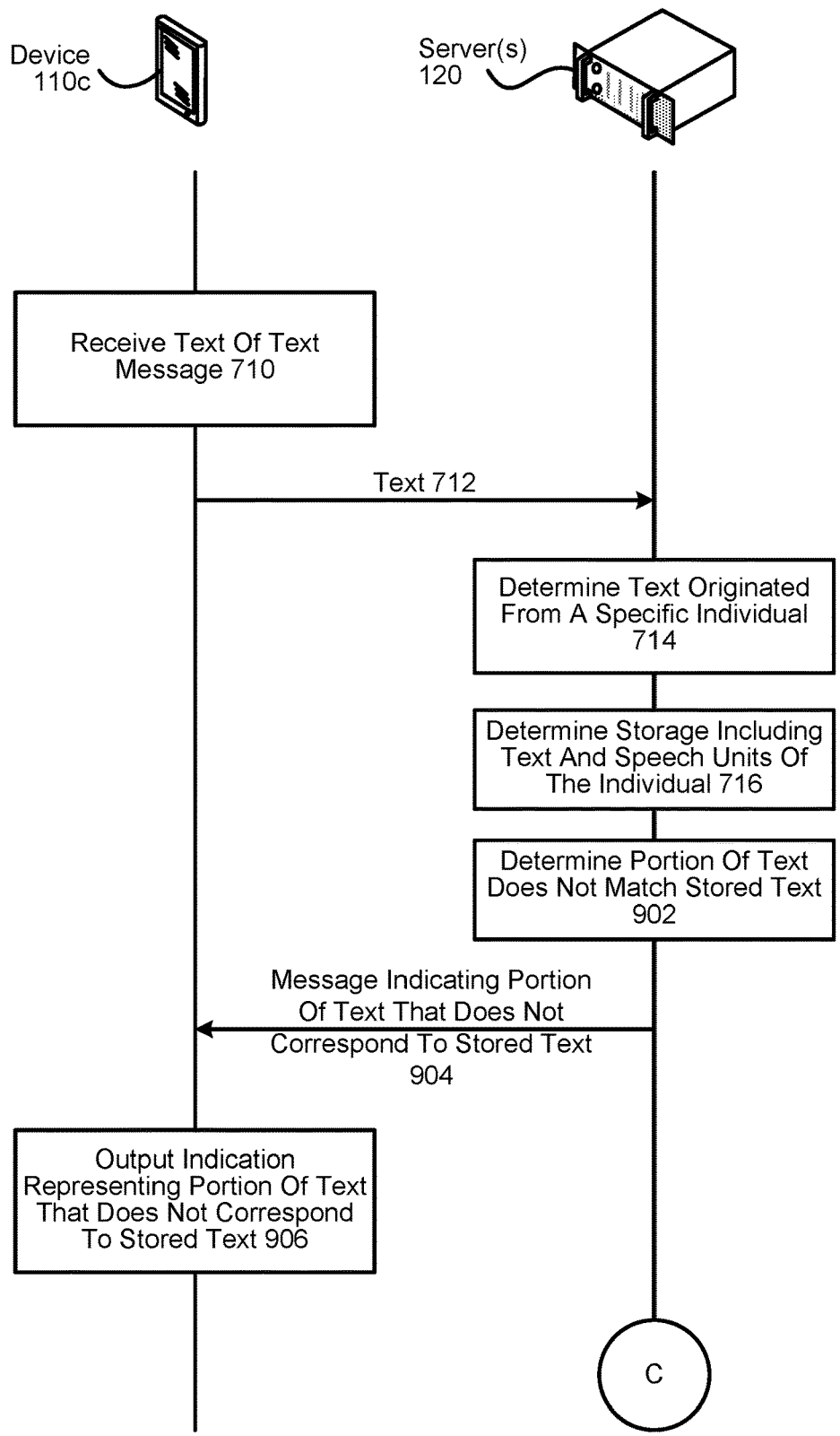
FIGS. 9A and 9B are a signal flow diagram illustrating the output of an indication representing a portion of a text message does not correspond to stored text and the receipt of spoken audio corresponding to the portion of the text message according to embodiments of the present disclosure.
Figure 9B:
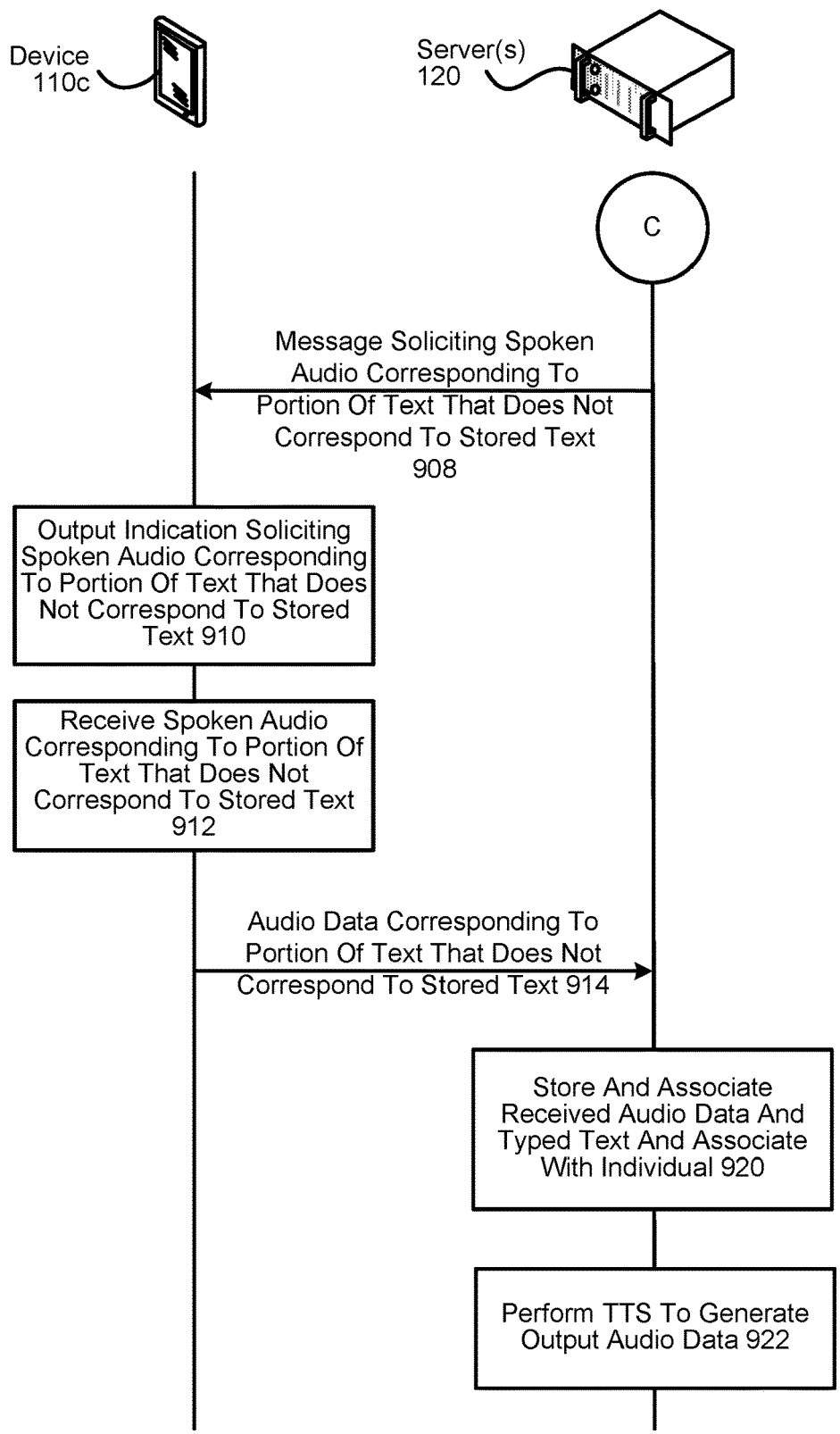

As a user is typing a text message for use with the above system, it may be desirable to provide some feedback to the user to indicate where text message content does not match with text of previously stored speech. In so doing, the system may solicit speech corresponding to the text message content in order to update the library of speech. FIGS. 9A and 9B illustrate the output of an indication representing a portion of a text message does not correspond to stored text and the receipt of spoken audio corresponding to the portion of the text message that does not correspond to stored text. A device 110c may receive (710) content text of a text message, and optionally recipient text corresponding to an intended recipient of the text message. The device 110c may receive the text via a keyboard integrated into the device 110c, or a keyboard in communication with the device 110c via wireless communications, Bluetooth, etc. The device 110c, for example via a companion application, sends (712) the received text (i.e., the content text and optionally the recipient text) to the server 120.

The server 120 may determine (714) the individual that typed the text message, and therefrom may determine (716) a storage including text and audio data of the individual. The server 120 may also determine (902) at least a portion of text of the text message does not correspond to stored text. The portion of text of the text message not corresponding to stored text may be a diphone, a word, a sequence of words, or the like. The server 120 then sends (904) a message to the device 110c (or another device of the individual represented in the individual's user profile) indicating the portion of text of the text message that does not correspond to stored text. In turn, the device 110c (or other device of the individual) outputs (906) an indication representing the text of the text message that not correspond to stored text associated with audio data corresponding to previously spoken content of the individual.

The output indication may be visual, audible, and/or tactile. For example, referring to FIG. 9C, if the text message states "Hi Mom, I'll try to call you tomorrow. Love you!", "Hi Mom" and "Love you!" may correspond to stored text, while "I'll try to call you tomorrow." may not correspond to stored text. In this example, if the output indication is visual, "Hi Mom," 806 and "Love you!" 808 may be displayed in a first color with or without effects (e.g., blinking, etc.), and/or may be indicated with font manipulations (e.g., bold, underline, italics, etc.). Additionally, "I'll try to call you tomorrow." 810 may be displayed in a different shade of the first color, in a second color with or without effects, and/or may be indicated with font manipulations. Alternatively, both the text corresponding and not corresponding to stored text may be shown in the exact same color, with either the text corresponding to the stored text of the text not corresponding to stored text being displayed with an effect (e.g., blinking, etc.).

Figure 9C:
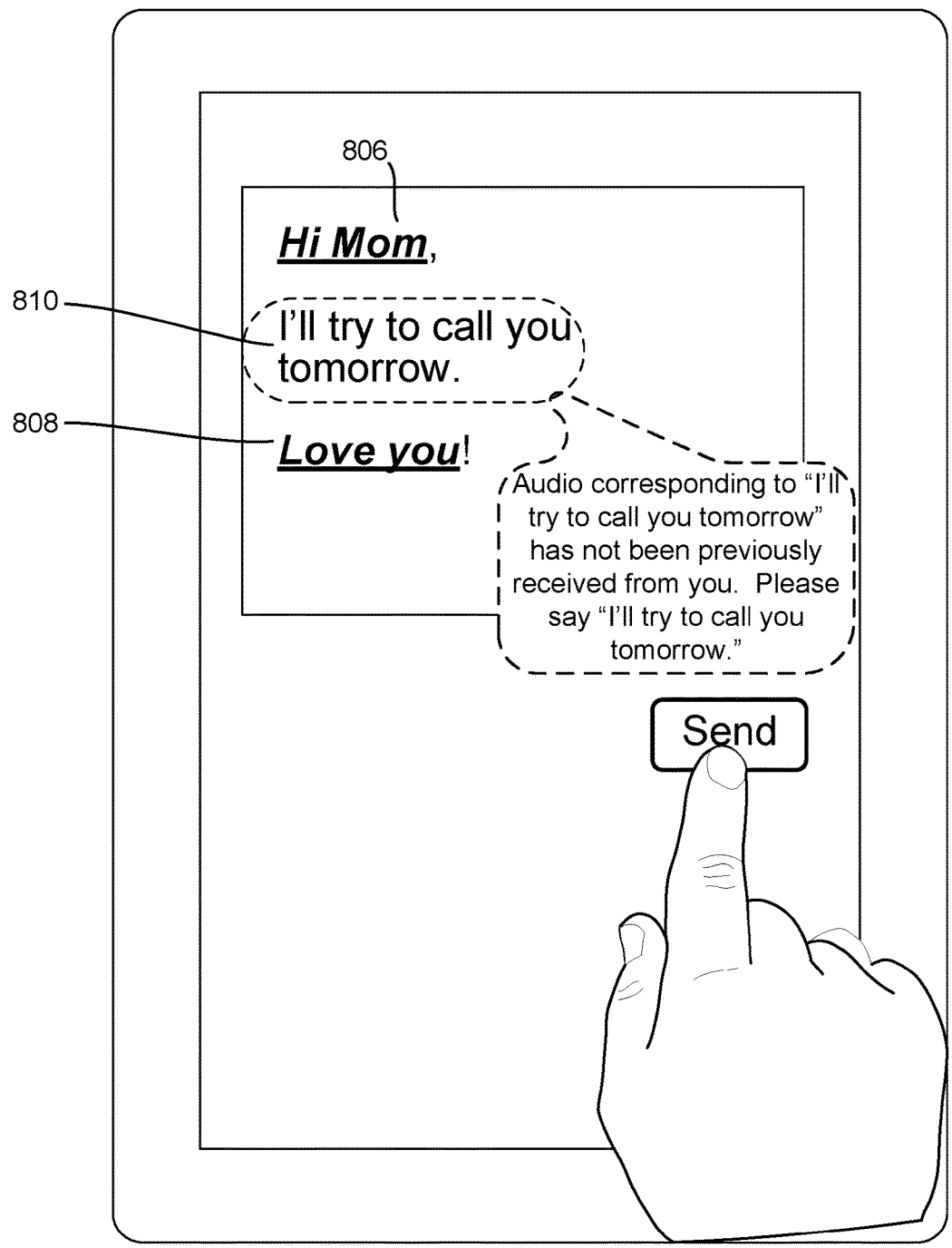
FIG. 9C illustrates a user device soliciting audio corresponding to a portion of a text message that does not correspond to stored text.

Referring again to FIG. 9B, the server 120 also sends (908) another message to the device 110c (or other device of the individual) soliciting spoken audio corresponding to the text of the text message that does not correspond to any stored text. In turn, the device 110c (or other device of the individual) outputs (910) an indication soliciting spoken audio corresponding to the text of the text message that does not correspond to any stored text. The output indication may be visual, audible, and/or tactile. For example, a visual indication may be text displayed on a display of the device 110c (or other device of the individual). For example, the visual indication may state "Audio corresponding to 'I'll try to call you tomorrow' has not been previously received from you. Please say, 'I'll try to call you tomorrow.'", as illustrated in FIG. 9C. If the indication is audible, the output audio may be wholly or partly computer generated using TTS processes. When the device 110c (or other device of the individual) receives (912) spoken audio corresponding to the text of the text message that does not correspond to any stored text, the device 110c (or other user device) converts the spoken audio into audio data, and causes (914) the audio data to be sent to the server 120. For example, the audio data may be sent to the server 120 via a companion application. For purposes of building the speaker's voice corpus, the server 120 may perform ASR on the audio data to determine text, and store (920) and associate the received audio data and the created text. For purposes of generating the output audio data to the recipient, the server 120 may perform ASR processing to determine message content within received audio data. In the example above, the server 120 may store audio data corresponding to "I'll try to call you tomorrow" with the text "I'll try to call you tomorrow." Alternatively, the server 120 may store audio data corresponding to "I'll with the text "I'll", audio data corresponding to "try" with the text "try", etc. It also be appreciated that the audio data and stored text may be further broken down and stored on the diphone level. One skilled in the art should appreciate that the more refined the stored text and audio (e.g., word level versus diphone level), the more robust the library of stored text/audio data, and therefore the greater chance of stored text matching text of a text message. Using either stored audio data or raw audio data as it is received, depending on whether ASR processing is bypassed as discussed above, the server 120 generates (922) output audio data.

As a user is typing a text message for use with the above system, it may be desirable to provide some feedback to the user to indicate where text message content does not match with text of previously stored speech, that different already stored text (with corresponding audio) may be available that has a similar definition or meaning to the text message content. FIG. 10 illustrates the offering and selection of alternative text for a text message. A device 110*c* may receive (710) content text of a text message, and optionally recipient text corresponding to an intended recipient of the text message. The device 110*c* may receive the text via a keyboard integrated into the device 110*c*, or a keyboard in communication with the device 110*c* via wireless communications, Bluetooth, etc. The device 110*c*, for example via a companion application, sends (712) the received text (i.e., the content text and optionally the recipient text) to the server 120.

Figure 11:
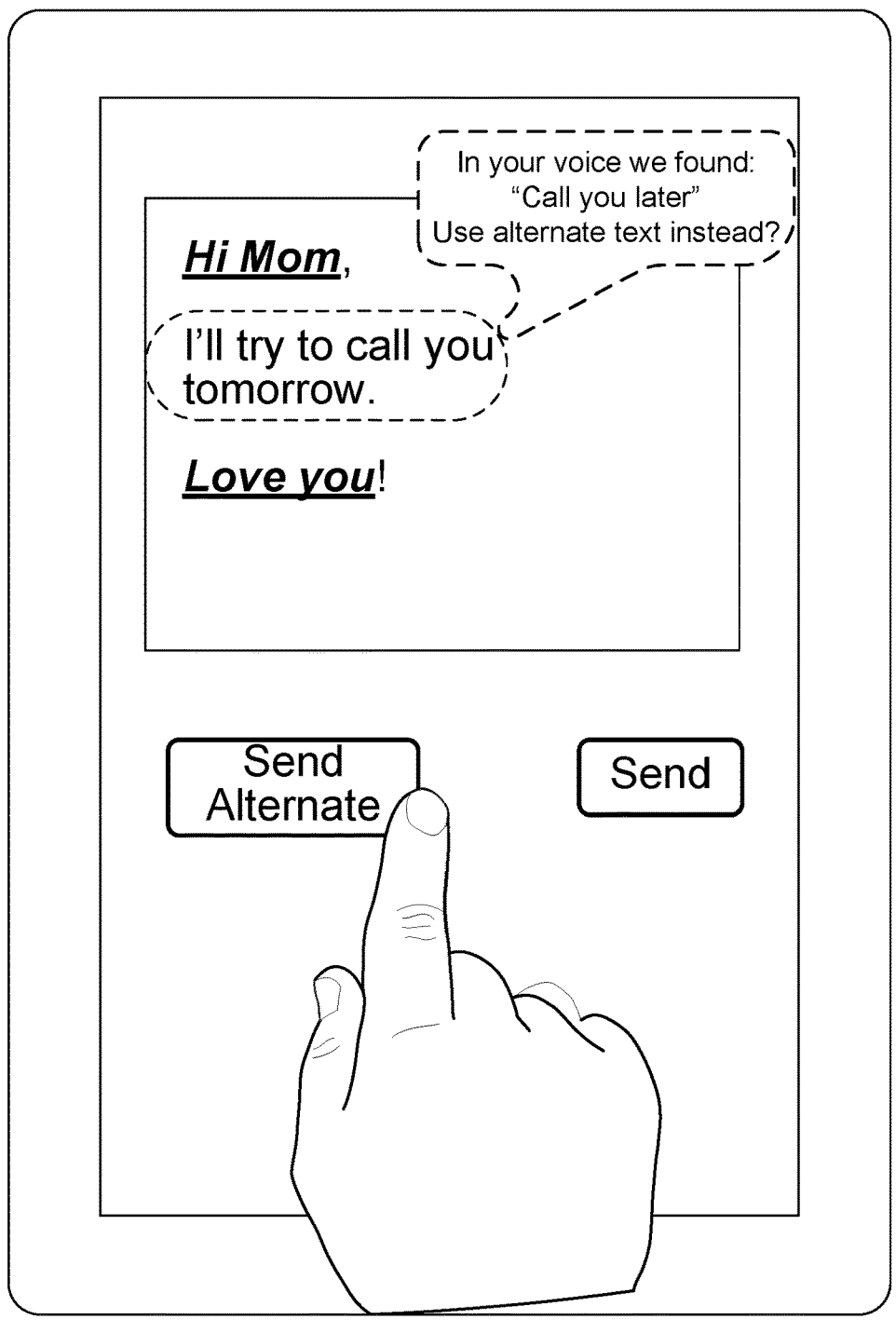
FIG. 11 illustrates a user device indicating that certain portions of a text message may correspond to alternate synonymous stored text that matches stored audio data.

The server 120 may determine (714) the individual that typed the text message, and therefrom may determine (716) a storage including text and audio data of the individual. The server 120 also determines (902) a portion of text of the text message does not match stored text, but determines (1002) stored text that is a synonym of the text of the text message that does not correspond to stored text. As used herein, synonym or synonym text refers to text having a same or substantially same meaning as other text. For example, the text message may include "I would like a slice of cheese pizza." The server 120 may determine "slice" does not correspond to stored text, but there is stored text corresponding to "piece." Upon determining the synonym stored text, the server 120 may send (1004) a message to the device 110*c*, the speech-controlled device 110*a* (e.g., if the individual is near the speech-controlled device 110*a* and has a user preference directing the system to capture audio commands when possible), or another device of the individual indicating the text of the text message not corresponding to stored text, as well as indicating the synonym text. In response, the individual's device that receives the message may output an indication corresponding to the received message (illustrated in FIG. 11), may receive an acceptance indication from the individual to use the synonym text, and may send (1006) an indication of the acceptance to the server 120. The server 120 may then generate (922) output audio data using audio data associated with the stored and accepted synonym text. The individual may indicate its acceptance of use of the synonym text/audio data verbally (e.g., speak acceptance to the speech-controlled device 110*a*) or physically (e.g., by interacting with a virtual button on a display of the device 110*a*).

Figure 12:
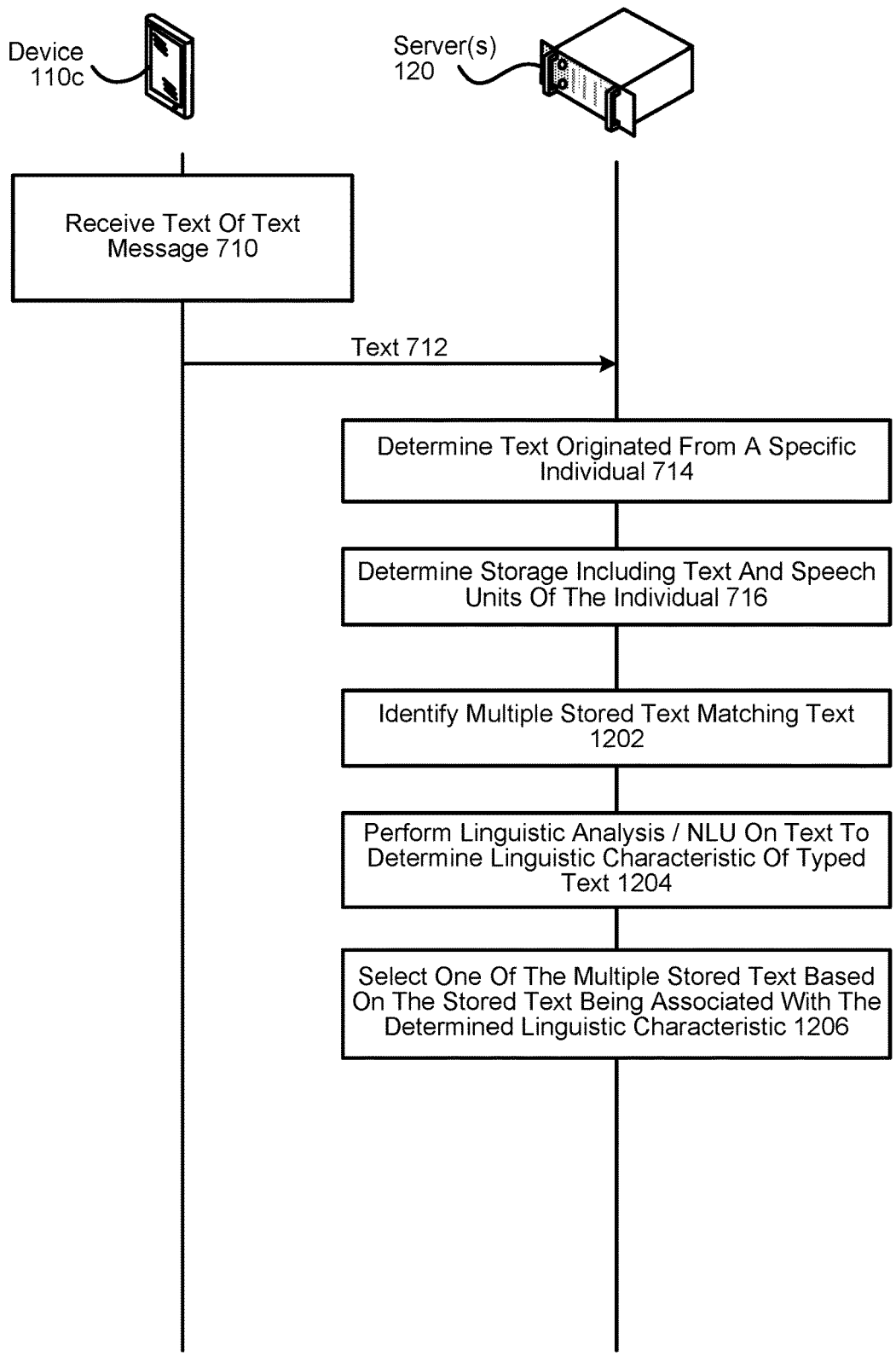
FIG. 12 is a signal flow diagram illustrating the selection of stored text when multiple identical portions of stored text are identified according to embodiments of the present disclosure.

FIG. 12 illustrates the selection of stored text when multiple identical portions of stored text are identified. A device 110*c* may receive (710) content text of a text message, and optionally recipient text corresponding to an intended recipient of the text message. The device 110*c* may receive the text via a keyboard integrated into the device 110*c*, or a keyboard in communication with the device 110*c* via wireless communications, Bluetooth, etc. The device 110*c*, for example via a companion application, sends (712) the received text (i.e., the content text and optionally the recipient text) to the server 120.

The server 120 may determine (714) the individual that typed the text message, and therefrom may determine (716) a storage including text and audio data of the individual. The server 120 then determines (1202) multiple portions of stored text match the input text of the text message. When this occurs, the server 120 may perform (1204) linguistic analysis/NLU processes on the text of the text message to determine a semantic, sentiment, and/or prosodic characteristic of the text of the text message. The server 120 then selects (1206) one portion of the stored texts having a similar or identical (with identical being preferred) characteristic associated therewith.

Although the system above is described as storing text with associated incoming audio, the system may also operate such that instead of storing text with associated audio data to form a voice corpus of an individual, the herein disclosed system may instead store text associated with indicators of audio, with the indicators of audio representing qualities of spoken utterances. For example, such indicators may be identifiers of speech units (e.g., a diphone ID number). This may create better privacy for the speaker in that the text corresponding to a user's spoken utterances may not necessarily be saved by the system, and rather the system may associate the incoming audio to a series of identifiers of speech units (e.g., polyphones). The speech unit IDs may correspond to speech units having particular characteristics (e.g., a diphone used in a particular manner, etc.). For example, audio data may be stored with corresponding features of the audio data (e.g., ID of diphone, name of phonemes that are concatenated, location of phoneme/diphone in word/syllable, etc.). Such storage techniques may be beneficial, for example, when each portion of stored text corresponds to a polyphone (i.e., each two or more diphones). When such storage techniques are used, the server 120 may identify stored text corresponding to text of a text message, may identify one or more audio indicators/ speech qualities associated with the stored text, and may perform TTS using the audio indicators/speech qualities, thereby generating output audio data that sounds like the individual sending the text message.

Figure 13:
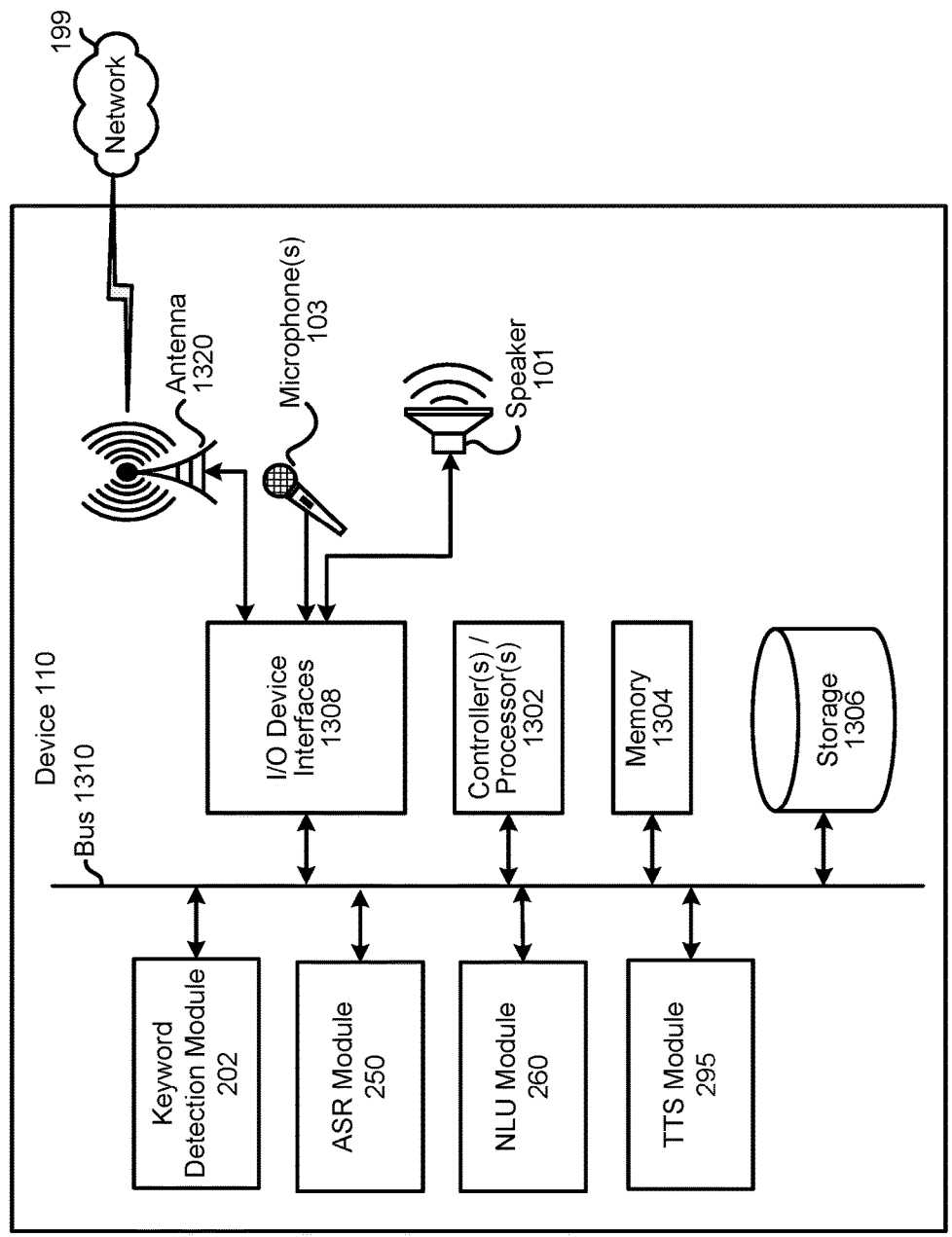
FIG. 13 is a block diagram conceptually illustrating example components of a device according to embodiments of the present disclosure.
Figure 14:
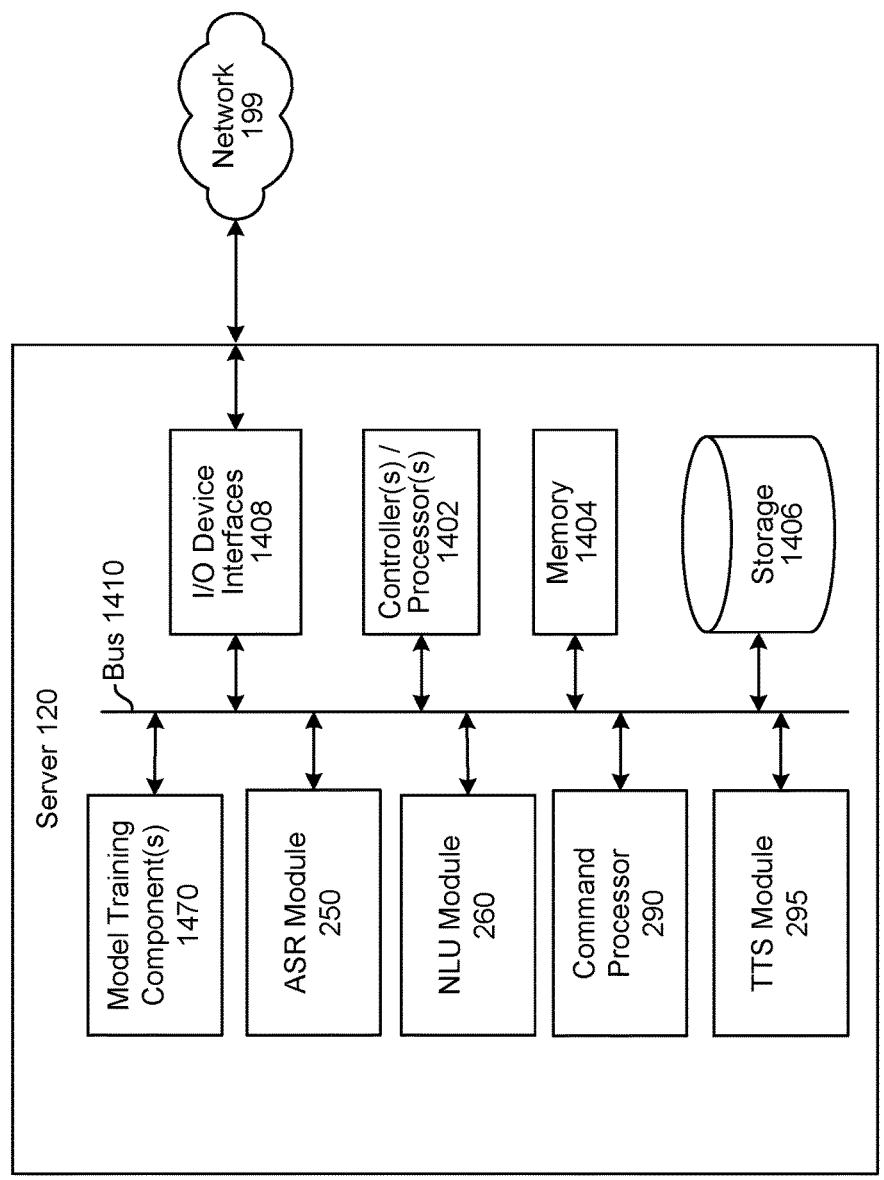
FIG. 14 is a block diagram conceptually illustrating example components of a server according to embodiments of the present disclosure.

FIG. 13 is a block diagram conceptually illustrating a local device 110 that may be used with the described system and may incorporate certain speech receiving/keyword spotting capabilities. FIG. 14 is a block diagram conceptually illustrating example components of a remote device, such as a remote server 120 that may assist with ASR, NLU processing, or command processing. Server 120 may also assist in determining similarity between ASR hypothesis results as described above. Multiple such servers 120 may be included in the system, such as one server 120 for ASR, one server 120 for NLU, etc. In operation, each of these devices may include computer-readable and computer-executable instructions that reside on the respective device (110/120), as will be discussed further below.

Each of these devices (110/120) may include one or more controllers/processors (1302/1402), that may each include a central processing unit (CPU) for processing data and computer-readable instructions, and a memory (1304/1404) for storing data and instructions of the respective device. The memories (1304/1404) may individually include volatile random access memory (RAM), non-volatile read only memory (ROM), non-volatile magnetoresistive (MRAM)

and/or other types of memory. Each device may also include a data storage component (1306/1406), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1308/1408). The storage component (1306/1406) may include storage for various data including ASR models 250, NLU storage 273, entity library 282, speech quality models 353, TTS voice unit storage 372, or other storage used to operate the system.

Computer instructions for operating each device (110/120) and its various components may be executed by the respective device's controller(s)/processor(s) (1302/1402), using the memory (1304/1404) as temporary "working" storage at runtime. A device's computer instructions may be stored in a non-transitory manner in non-volatile memory (1304/1404), storage (1306/1406), or an external device(s). Alternatively, some or all of the executable instructions may be embedded in hardware or firmware on the respective device in addition to or instead of software.

Each device (110/120) includes input/output device interfaces (1308/1408). A variety of components may be connected through the input/output device interfaces, as will be discussed further below. Additionally, each device (110/120) may include an address/data bus (1310/1410) for conveying data among components of the respective device. Each component within a device (110/120) may also be directly connected to other components in addition to (or instead of) being connected to other components across the bus (1310/1410).

Referring to the device 110 of FIG. 13, the input/output device interfaces 1310 connect to a variety of components such as an audio output component such as a speaker 101, a wired headset or a wireless headset (not illustrated) or an audio capture component. The audio capture component may be, for example, a microphone 103 or array of microphones, a wired headset or a wireless headset (not illustrated), etc. If an array of microphones is included, approximate distance to a sound's point of origin may be performed by acoustic localization based on time and amplitude differences between sounds captured by different microphones of the array. The microphone 103 may be configured to capture speech including an utterance. The device 110 (using microphone 103, ASR module 250, etc.) may be configured to determine audio data corresponding to the utterance. The device 110 (using input/output device interfaces 1308, antenna 1320, etc.) may also be configured to transmit the audio data to server 120 for further processing.

For example, via the antenna(s) 1320, the input/output device interfaces 1308 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as wakewords detected by the device, whereas extended speech recognition may be configured to recognize a much larger range of words.

The device 110 and/or server 120 may include a limited or extended NLU module 260. The NLU module in device 110 may be of limited or extended capabilities. The NLU module 260 may comprising the name entity recognition module 262, the intent classification module 264 and/or other components. The NLU module 260 may also include NLU storage 273 and/or entity library 282, or those storages may be separately located.

One or more servers 120 may also include a command processor 290 that is configured to execute commands associated with an ASR hypothesis as described above. One or more servers 120 may also include a machine learning training component 1470 that is configured to determine one or more models used by, for example, a speech quality module 352.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 13 and 14, are exemplary, and may be located a stand-alone device or may be included, in whole or in part, as a component of a larger device or system.

Figure 15:
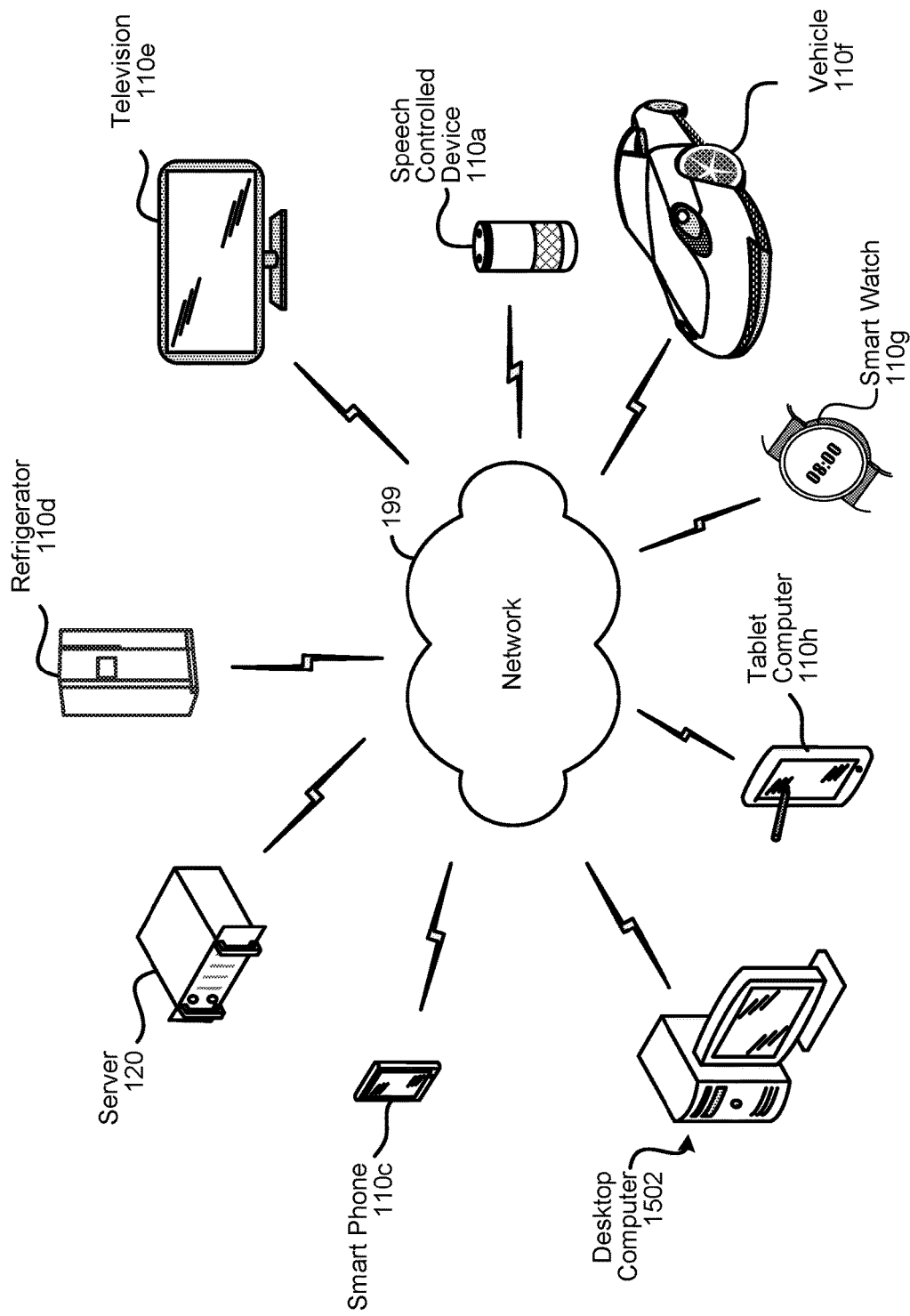
FIG. 15 illustrates an example of a computer network for use with the system.

As illustrated in FIG. 15, multiple devices (110*a-h*, 120, and/or 1502) may contain components of the system 100 and the devices may be connected over a network 199. The network 199 is representative of any type of communication network, including data and/or voice network, and may be implemented using wired infrastructure (e.g., cable, CATS, fiber optic cable, etc.), a wireless infrastructure (e.g., WiFi, RF, cellular, microwave, satellite, Bluetooth, etc.), and/or other connection technologies. Devices may thus be connected to the network 199 through either wired or wireless connections. Network 199 may include a local or private network or may include a wide network such as the internet. For example, devices 110, networked computer(s) 1502, etc. may be connected to the network 199 through a wireless service provider, over a WiFi or cellular network connection or the like. Other devices, such as server(s) 120, may connect to the network 199 through a wired connection or wireless connection. Networked devices 110 may capture audio using one-or-more built-in or connected microphones 103 or audio capture devices, with processing performed by speech quality module 352, ASR, NLU, or other components of the same device or another device connected via network 199, such as speech quality module 352, ASR 250, NLU 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving first input audio data corresponding to an utterance;
   performing automatic speech recognition processing on the first input audio data to create first reference text data;
   in a database associated with a first user profile, storing a first association between the first input audio data and the first reference text data;
   receiving, from a first device associated with the first user profile, a message intended for a second device, the message including first text data;
   determining the first text data corresponds to the first reference text data;
   identifying the first input audio data in the database based at least in part on the first association;
   causing the first device to output a visual indication representing that the first text data corresponds to the first reference text data;
   generating, after causing the first device to output the visual indication, output audio data including the first input audio data; and
   sending, to the second device, the output audio data.

2. The computer-implemented method of claim 1, further comprising:
   receiving second input audio data corresponding to a second utterance;
   performing automatic speech recognition processing on the second input audio data to create second reference text data;
   in the database, storing a second association between the second input audio data and the second reference text data;
   determining a pronunciation of the first text data;
   determining a first diphone identifier associated with the first reference text data;
   determining a second diphone identifier associated with the second reference text data; and
   determining the first diphone identifier and the second diphone identifier correspond to the pronunciation,
   wherein generating the output audio data comprises concatenating the first input audio data to the second input audio data.

3. The computer-implemented method of claim 2, further comprising:
   associating the first reference text data with first pronunciation data;
   associating the second reference text data with second pronunciation data;
   receiving, from the first device, a third message intended for the second device, the third message including second text data;
   determining the second text data corresponds to a first word of the first reference text data and a second word of the second reference text data, the first word being identical to the second word;
   performing prosodic analysis processing on the second text data to determine third pronunciation data; and
   identifying the first word for generating second output audio data based at least in part on the first pronunciation data being at least similar to the third pronunciation data.

4. A system, comprising:
   at least one processor; and
   at least one memory including instructions that, when executed by the at least one processor, cause the system to:
      receive first input audio data corresponding to at least one first utterance associated with user profile data;
      perform automatic speech recognition processing on the first input audio data to create first text data;
      associate the first text data with the user profile data, the first text data being associated with at least a portion of the first input audio data, the at least a portion of the first input audio data having a first prosodic characteristic;
      receive second text data;
      determine the second text data is associated with the user profile data;
      determine the first text data corresponds to at least a portion of the second text data;
      determine the at least a portion of the second text data is associated with third text data, the third text data being associated with second input audio data having a second prosodic characteristic;
      perform prosodic analysis processing on the second text data to determine a third prosodic characteristic;
      determine the third prosodic characteristic at least substantially matches the first prosodic characteristic;
      generate, after determining the third prosodic characteristic at least substantially matches the first prosodic characteristic, output audio data using the at least a portion of the first input audio data; and
      send the output audio data to a first device.

5. The system of claim 4, wherein a first portion of the first input audio data represents a diphone and wherein the at least one memory further includes instructions that, when executed by the at least one processor, further cause the system to:
   determine a pronunciation of the second text data;
   determine the diphone corresponds to the pronunciation; and
   generate the output audio data based at least in part on the diphone corresponding to the pronunciation.

6. The system of claim 4, wherein the at least one memory further includes instructions that, when executed by the at least one processor, further cause the system to:
- cause a second device to output a first visual indication representing a first portion of the second text data corresponds to the first text data; and
- cause the second device to output a second visual indication representing a second portion of the second text data does not correspond to the first text data, the first visual indication and the second visual indication being different with respect to at least color.

7. The system of claim 4, wherein the at least one memory further includes instructions that, when executed by the at least one processor, further cause the system to:
- receive third text data;
- determine the third text data does not correspond to the first text data;
- cause a second device to request further input audio corresponding to at least one second utterance corresponding to the third text data;
- receive, from the second device, second input audio data; and
- associate the third text data with the second input audio data and the user profile data.

8. The system of claim 4, wherein the at least one memory further includes instructions that, when executed by the at least one processor, further cause the system to:
- receive third text data representing a first word;
- determine the first word does not correspond to the first text data;
- perform natural language understanding processing on the third text data;
- determine a second word having a similar meaning as the first word;
- determine the second word corresponds to the first text data; and
- send, to a second device, first data representing the second word.

9. The system of claim 4, wherein the at least one memory further includes instructions that, when executed by the at least one processor, further cause the system to:
- receive third text data including a first portion and a second portion;
- determine a first portion of the first text data corresponding to the first portion of the third text data;
- determine a second portion of the first text data corresponding to the second portion of the third text data; and
- generate second output audio data at least partially corresponding to the first portion of the first text data and the second portion of the first text data.

10. The system of claim 9, wherein the first portion of the first text data is a first sequence of words and the second portion of the first text data is a second sequence of words.

11. A computer-implemented method, comprising:
- receiving first input audio data corresponding to at least one first utterance associated with user profile data;
- performing automatic speech recognition processing on the first input audio data to create first text data;
- associating the first text data with the user profile data, the first text data being associated with at least a portion of the first input audio data;
- receiving second text data;
- determining the second text data is associated with the user profile data;
- determining the first text data corresponds to a first portion of the second text data;
- causing a first device to request further input audio data corresponding to at least one second utterance corresponding to a second portion of the second text data;
- receiving, from the first device and after causing the first device to request further input audio data, second input audio data;
- associating the second portion of the second text data with the second input audio data and the user profile data;
- generating output audio data using the at least a portion of the first input audio data and the second input audio data; and
- sending the output audio data to a second device.

12. The computer-implemented method of claim 11, further comprising:
- receiving recipient information; and
- determining the second device using at least one of the user profile data or the recipient information.

13. The computer-implemented method of claim 11, further comprising:
- receiving third text data;
- determining the third text data corresponds to fourth text data, the fourth text data being associated with first audio data having a first prosodic characteristic;
- determining the third text data corresponds to fifth text data, the fifth text data being associated with second audio data having a second prosodic characteristic;
- performing prosodic analysis processing on the third text data to determine a third prosodic characteristic; and
- selecting the first audio data for text-to-speech processing based at least in part on the third prosodic characteristic at least substantially matching the first prosodic characteristic.

14. The computer-implemented method of claim 11, further comprising:
- causing the first device to output a first visual indication representing a first portion of the second text data corresponds to the first text data; and
- causing the first device to output a second visual indication representing a second portion of the second text data does not correspond to the first text data, the first visual indication and the second visual indication being different with respect to at least color.

15. The computer-implemented method of claim 11, further comprising:
- receiving third text data including a first word;
- determining the first word does not correspond to the first text data;
- performing natural language understanding processing on the third text data;
- determining a second word having a similar meaning as the first word;
- determining the second word corresponds to the first text data; and
- sending, to the first device, first data representing the second word.

16. The computer-implemented method of claim 11, further comprising:
- receiving third text data including a first portion and a second portion;
- determining a first portion of the first text data corresponding to the first portion of the third text data;
- determining a second portion of the first text data corresponding to the second portion of the third text data; and
- generating second output audio data at least partially corresponding to the first portion of the first text data and the second portion of the first text data.

17. The computer-implemented method of claim 16, wherein the first portion of the first text data is a first sequence of words and the second portion of the first text data is a second sequence of words.

18. A system, comprising:
  at least one processor; and
  at least one memory including instructions that, when executed by the at least one processor, cause the system to:
    receive input audio data corresponding to at least one utterance associated with user profile data;
    perform automatic speech recognition processing on the input audio data to create first text data;
    associate the first text data with the user profile data and at least a portion of the input audio data;
    receive second text data representing at least a first word;
    determine the second text data is associated with the user profile data;
    determine the first word does not correspond to the first text data;
    perform natural language understanding processing on the second text data;
    determine a second word having a similar meaning as the first word;
    determine the second word corresponds to the first text data;
    send, to a first device, first data representing the second word;
    receive, from the first device, an indication representing the second word is to be used;
    generate output audio data using the second word; and
    send the output audio data to a second device.

* * * * *